United States Patent
Frankel et al.

(10) Patent No.: US 10,067,747 B2
(45) Date of Patent: Sep. 4, 2018

(54) EMBEDDED DEVICE APPLICATION DEVELOPMENT

(75) Inventors: Robert Frankel, Coleta, CA (US); Charles Walden, Austin, TX (US)

(73) Assignee: Emmoco, Inc., Austin, TX (US)

( * ) Notice: Subject to any disclaimer, the term of this patent is extended or adjusted under 35 U.S.C. 154(b) by 0 days.

(21) Appl. No.: 14/238,613

(22) PCT Filed: Mar. 23, 2012

(86) PCT No.: PCT/US2012/030403
§ 371 (c)(1),
(2), (4) Date: May 30, 2014

(87) PCT Pub. No.: WO2013/025254
PCT Pub. Date: Feb. 21, 2013

(65) Prior Publication Data
US 2014/0359565 A1 Dec. 4, 2014

Related U.S. Application Data

(60) Provisional application No. 61/523,105, filed on Aug. 12, 2011, provisional application No. 61/530,642, (Continued)

(51) Int. Cl.
G06F 8/00 (2018.01)
G06F 8/30 (2018.01)
G08C 17/02 (2006.01)

(52) U.S. Cl.
CPC .............. *G06F 8/00* (2013.01); *G06F 8/30* (2013.01); *G08C 17/02* (2013.01)

(58) Field of Classification Search
None
See application file for complete search history.

(56) References Cited

U.S. PATENT DOCUMENTS

2003/0167347 A1* 9/2003 Combs .................. G06F 3/1204
709/250
2007/0114291 A1 5/2007 Pouchak
(Continued)

FOREIGN PATENT DOCUMENTS

CA 2 709 651 12/2010

OTHER PUBLICATIONS

Freitag, "How to Install and Run the Android Emulator", http://www.petefreitag.com/item/763.cfm, accessed on Sep. 20, 2015.*
(Continued)

*Primary Examiner* — Charles E Anya
*Assistant Examiner* — Timothy P Duncan
(74) *Attorney, Agent, or Firm* — Jeffrey T. Placker; Holland & Knight LLP

(57) ABSTRACT

Virtual data objects of an electronic device may be represented as one or more resources. A connection independent protocol and implementation of the protocol may be automatically generated from the resources. The syntax and/or semantics of the protocol may be derived from the defined resources, so the protocol may be uniquely configured for each set of uniquely defined resources. The resources may be used to create application schemas used by application developers to efficiently create applications running on user computing systems. The resources may be used to create an embedded adapter that may include programming code enabling data to be read from and/or written to the virtual data objects in the electronic device. During operation, once the user computing system and the electronic device have established connectivity, data may be exchanged between the device and the user computing system through the connection independent protocol.

51 Claims, 23 Drawing Sheets

Related U.S. Application Data filed on Sep. 2, 2011, provisional application No. 61/545,967, filed on Oct. 11, 2011.

(56) References Cited

U.S. PATENT DOCUMENTS

| | | | |
|---|---|---|---|
| 2008/0045172 A1 | 2/2008 | Narayanaswami et al. | |
| 2008/0133052 A1* | 6/2008 | Jones | B25J 5/007 |
| | | | 700/245 |
| 2008/0256510 A1* | 10/2008 | Auerbach | G06F 8/30 |
| | | | 717/107 |
| 2009/0288132 A1 | 11/2009 | Hegde | |
| 2010/0201891 A1 | 8/2010 | Laroia et al. | |
| 2010/0235373 A1* | 9/2010 | Holden | G06F 13/385 |
| | | | 707/758 |

OTHER PUBLICATIONS

International Search Report for PCT/US2012/030403 dated Jul. 6, 2012.

International Preliminary Report on Patentability received in International Application No. PCT/US2012/030403, dated Feb. 18, 2014, pp. 1-10.

* cited by examiner

FIG. 2 currentTime Resource 201
```
type TimeOfDay: struct
    hour:     HourofDay.Type  } 202
    minute:   Minute.Type
end
resource currentTime: TimeOfDay
    mockDefault = {hour: 10, minute: 30}
end
``` currentDay Resource 203
```
type Days: enum
    SUNDAY, MONDAY, TUESDAY, WEDNESDAY, THURSDAY,  } 204
    FRIDAY, SATURDAY
end
resource currentDay: Days
    mockDefault = MONDAY
end
``` currentTempInF Resource 205
```
from com.emmoco.framework.types import
DiscreteValueT {
    minValue: 20, maxValue: 105, stepValue: 1  } 206
} as TemperatureInF
resource currentTempInF: TemperatureInF.Type
    em$access = READONLY
    mockDefault = 75.0
end
``` schedule Resource 207
```
type TimeAndTemperature: struct
    start:        TimeOfDay              } 208
    temperature:  TemperatureInF.Type
end type Schedule: struct
    wake:    TimeAndTemperature
    leave:   TimeAndTemperature   } 209
    back:    TimeAndTemperature
    sleep:   TimeAndTemperature
end resource schedule: Schedule
end
```

```
package bob.examples from com.emmoco.framework.types import DiscreteValueT {
    minValue: 0.5, maxValue: 2.0, stepValue: 0.5,
precision: 3
} as Delay from com.emmoco.framework.types import ServiceI interface BlinkerI: ServiceI type Cmd: enum
        START_CMD, STOP_CMD
    end type LedState: enum
        LED_OFF, LED_ON
    end resource cmd: Cmd
        em$access = WRITEONLY
    end resource count: int16
        em$access = READWRITE
        em$noIndicator
    end resource delay: Delay.Type
        em$access = READWRITE
        em$noIndicator
    end resource ledState: LedState
        em$access = READONLY
    end end
```

```
                              702
  { ┌─ "resources": {
    │   "cmd": {"id": 1, "align": 1, "type":
    │       E:bob.examples.BlinkerI/Cmd", "access":
    │       "w","size": 1},
    │   "count": {"id": 2,"align": 1,"type": "i2","access":
701 │       "rw",          "size": 2},
    │   "delay": {"id": 3, "align": 1, "type":
    │       D:bob.examples.BlinkerI__Delay/Type", "access":
    │       "rw", "size": 4},
    │   "ledState": {"id": 4, "align": 1, "type":
    │       "E:bob.examples.BlinkerI/LedState", "access":
    └─      "ri", "size": 1}}, "manifest": {
        "name": "bob.examples.BlinkerI",
        "uuid": "ffa0","date": "2011-08-01T15:23:59",
        "maxAlign": 1, "maxSize": 4, "version": "0.0.0"}, "resourceNames": ["cmd", "count", "delay", "ledState"], "types": {"std:i2": {"align": 1,"size": 2},
        "bob.examples.BlinkerI/Cmd": {
            "values": [
        703 { "START_CMD",
              "STOP_CMD" ],
            "align": 1,"type":E:bob.examples.BlinkerI/Cmd",
            "size": 1
        },
        "std:i4": {"align": 1, "size": 4},
        "bob.examples.BlinkerI__Delay/Type": {
              ┌ "min": 0.5, "max": 2,"align": 1,
        703 { "type": "D:bob.examples.BlinkerI__Delay/Type",
              └ "prec": 3, "step": 0.5,"size": 4
        },
        "std:u1": {"align": 1, "size": 1},
        "bob.examples.BlinkerI/LedState": {
            "values": [
        703 { "LED_OFF",
              "LED_ON" ],
            "align": 1,
            "type": "E:bob.examples.BlinkerI/LedState",
            "size": 1
        }}}
```

```
package bob.examples from com.emmoco.distro.bt import DistroC
from com.emmoco.distro.bt import ConnectionManager
from com.emmoco.framework.types import ConnectionManagerI
from em.kernel import EventDispatcher module BlinkerP_Adapter: ConnectionManagerI function ledState_indicator()

private:
    type Buffer: struct
        hdr: ConnectionManager.MsgHdr
        data: uint8[5]
    end
    var buffer: Buffer function dispatchFetch(id: uint16, buf: uint8*)
    function dispatchStore(id: uint16, buf: uint8*)
    function requestHandler()
    var requestEvent: EventDispatcher.Event end def em$construct()
    requestEvent.initH(requestHandler)
end def em$startup()
    ConnectionManager.awaitRequest(requestEvent)
    ConnectionManager.bindMsgHdr(buffer.hdr)
end def awaitDisconnect(event)
    ConnectionManager.awaitDisconnect(event)
end def acceptConnection(event)
    ConnectionManager.acceptConnection(event)
end def getConnectionStatus()
    return ConnectionManager.getConnectionStatus()
end
```

FIG. 8 (Continued)

```
                                800
def requestHandler()
    if buffer.hdr.kind == ConnectionManager.FETCH_MSG
        dispatchFetch(buffer.hdr.resId, &buffer.data[0])
    elif buffer.hdr.kind == ConnectionManager.STORE_MSG
        dispatchStore(buffer.hdr.resId, &buffer.data[0])
    end
end         801         804 def dispatchFetch(id, buf)
    switch id
    case 0:         803
        break
    case 2:
        ^^bob_examples_BlinkerP_count__fetch__E((void*)buf)^^
        ConnectionManager.sendDone(2)
    case 3:
        ^^bob_examples_BlinkerP_delay__fetch__E((void*)buf)^^
        ConnectionManager.sendDone(4)
    case 4:
        ^^bob_examples_BlinkerP_ledState__fetch__E((void*)buf)^^
        ConnectionManager.sendDone(1)
    end
end         802         804 def dispatchStore(id, buf)
    switch id
    case 0:         803
        break
    case 1:
        ^^bob_examples_BlinkerP_cmd__store__E((void*)buf)^^
        ConnectionManager.sendDone(0)
    case 2:
        ^^bob_examples_BlinkerP_count__store__E((void*)buf)^^
        ConnectionManager.sendDone(0)
    case 3:
        ^^bob_examples_BlinkerP_delay__store__E((void*)buf)^^
        ConnectionManager.sendDone(0)
    end
end def ledState_indicator()
    ConnectionManager.sendIndicator(4)
end
```

// resource currentTime  1701 struct TimeOfDay {
            num <0,23>   hour      ⤳ 1702
            num <0,59>   minute
        }
        TimeOfDay currentTime {
            mockDefault = {hour: 10, minute: 30}
        }

// resource currentDay  1703                              1704
                                                              ⤳
        enum Day {
            SUNDAY, MONDAY, TUESDAY, WEDNESDAY, THURSDAY,
            FRIDAY, SATURDAY
        }
        Day currentDay {
            mockDefault = MONDAY
        }

// resource currentTemperatureInF  1705 typedef num <20, 105, 1> TemperatureInF   ⤳ 1706
        TemperatureInF currentTemperatureInF // resource schedule  1707 struct TimeAndTemperature {  ⤳ 1708
            TimeOfDay        start
            TemperatureInF   temperature
        }
                                          1709
        struct Schedule {            ⤳
            TimeAndTemperature   wake
            TimeAndTemperature   leave
            TimeAndTemperature   back
            TimeAndTemperature   sleep
        }

Schedule schedule
```

```
/* -------- resource cmd --------- */
enum Cmd {
    START_CMD, STOP_CMD
}
Cmd cmd {
    writeonly
}
```
⎫
⎬ 1801
⎭

```
/* -------- resource count --------- */ int16 count {
    readwrite
}
```
⎫
⎬ 1802
⎭

```
/* -------- resource delay ---------- */
num <0.5, 2.0, 0.100> delay {
    readwrite
}
```
⎫
⎬ 1803
⎭

```
/* -------- resource ledState --------- */
enum LedState {
    LED_OFF, LED_ON
}
LedState ledState {
    readonly
    indicator
}
```
⎫
⎬ 1804
⎭

FIG. 19

```
                           1900
{                                1902
    "resources": {
        "cmd": {"id": 1, "align": 1,
            "attributes": {"writeonly": true},
            "type": "E:bfrankel@emmoco.com.Blinker/Cmd",
            "access": "w", "size": 1},
        "count": {"id": 2, "align": 2,
1901        "attributes": {"readwrite": true},
            "type": "i2",
            "access": "rw", "size": 2},
        "delay": {"id": 3, "align": 2,
            "attributes": {"readwrite": true},
            "type": "N:0.500000,2.000000,0.100000,3/u2", } 1903
            "access": "rw", "size": 2},
        "ledState": {"id": 4, "align": 1,
            "attributes": {"indicator": true, "readonly": true},
            "type": "E:bfrankel@emmoco.com.Blinker/LedState",
            "access": "ir", "size": 1}}, "resourceNames": ["cmd", "count", "delay", "ledState"], "types": {
        "bfrankel@emmoco.com.Blinker/Cmd": {
            "values": [
        1903{   "START_CMD",
                "STOP_CMD"
            ],
            "align": 1,
            "type": "E:bfrankel@emmoco.com.Blinker/Cmd",
            "size": 1},
        "bfrankel@emmoco.com.Blinker/LedState": {
            "values": [
        1903{   "LED_OFF",
                "LED_ON"
            ],
            "align": 1,
            "type": "E:bfrankel@emmoco.com.Blinker/LedState",
            "size": 1}},

```
                                2000 ifndef Blinker_H
    #define Blinker_H include <stdbool.h>
    #include <stdint.h> typedef uint8_t Blinker_Cmd;
    #define Blinker_START_CMD 0
    #define Blinker_STOP_CMD 1
                                                    } 2001
    typedef uint8_t Blinker_LedState;
    #define Blinker_LED_OFF 0
    #define Blinker_LED_ON 1

/* resource cmd 2002 */
    typedef Blinker_Cmd Blinker_cmd_t;
    extern void Blinker_cmd_store(Blinker_cmd_t* const input);

/* resource count 2003 */
    typedef int16_t Blinker_count_t;
    extern void Blinker_count_fetch(Blinker_count_t* const
    output);
    extern void Blinker_count_store(Blinker_count_t* const
    input);

/* resource delay 2004 */
    typedef uint16_t Blinker_delay_t;
    extern void Blinker_delay_fetch(Blinker_delay_t* const
    output);
    extern void Blinker_delay_store(Blinker_delay_t* const
    input);

/* resource ledState 2005 */
    typedef Blinker_LedState Blinker_ledState_t;
    extern void Blinker_ledState_fetch(Blinker_ledState_t* const
    output);
    extern void Blinker_ledState_indicator();

void Blinker_connectHandler(void);
    void Blinker_disconnectHandler(void);

#endif /* Blinker_H */
```

```
#include "Blinker.h"

ifdef Em_Blinker_TODO void Blinker_cmd_store(Blinker_cmd_t* const input) {
    /* Insert Code Stub 2101: read resource 'cmd' from 'input' */
} void Blinker_count_fetch(Blinker_count_t* const output) {
    /* Insert Code Stub 2101: write resource 'count' into 'output' */
} void Blinker_count_store(Blinker_count_t* const input) {
    /* Insert Code Stub 2101: read resource 'count' from 'input' */
} void Blinker_delay_fetch(Blinker_delay_t* const output) {
    /* Insert Code Stub 2101: write resource 'delay' into 'output' */
} void Blinker_delay_store(Blinker_delay_t* const input) {
    /* Insert Code Stub 2101: read resource 'delay' from 'input' */
} void Blinker_ledState_fetch(Blinker_ledState_t* const output) {
    /* Insert Code Stub 2101: write resource 'ledState' into 'output' */
} endif
```

```
void Em_App_fetchDispatch(void) {
  switch (Em_App_msg.hdr.resId) {
  case 0:
      break;                                          2203                              2204
  case 2:
      Blinker_count_fetch((Blinker_count_t*)Em_App_msg.data);
      Em_Message_sendResponse(2);
      break;                                                                            2204
  case 3:
      Blinker_delay_fetch((Blinker_delay_t*)Em_App_msg.data);
      Em_Message_sendResponse(2);
      break;                                                                            2204
  case 4:
   Blinker_ledState_fetch((Blinker_ledState_t*)Em_App_msg.data);
      Em_Message_sendResponse(1);
      break;}}
              2202
void Em_App_storeDispatch(void) {
  switch (Em_App_msg.hdr.resId) {
  case 0:
      break;                             2203              2204
  case 1:
      Blinker_cmd_store((Blinker_cmd_t*)Em_App_msg.data);
      Em_Message_sendResponse(0);
      break;                                                                            2204
  case 2:
      Blinker_count_store((Blinker_count_t*)Em_App_msg.data);
      Em_Message_sendResponse(0);
      break;                                                                            2204
  case 3:
      Blinker_delay_store((Blinker_delay_t*)Em_App_msg.data);
      Em_Message_sendResponse(0);
      break;}}
void Blinker_ledState_indicator(void) {
  Em_Message_sendIndicator(4);}
```

EMBEDDED DEVICE APPLICATION DEVELOPMENT

CROSS-REFERENCE TO RELATED APPLICATIONS

This application is a National Phase application of PCT/US12/30403 filed Mar. 23, 2012, which claims priority to provisional applications Nos. 61/523,105 filed Aug. 12, 2011; 61/530,642 filed Sep. 2, 2011; and 61/545,967 filed Oct. 11, 2011, each entitled "Embedded Device Application Development". The contents of which is incorporated herein by reference in their entireties.

BACKGROUND

Many consumer and industrial electronic and electro-mechanical devices include interfaces through which a user is able to operate the device. For example, climate control systems may include a thermostat or other interface through which a user selects a desired temperature. Garage door openers may include a wireless remote through which a user can transmit a signal to the garage door opener to open or close the garage door. Other devices, such as appliances, scales, audio/visual systems, and tools, often include knobs, buttons, dials, switches, touch screens, or others controls to view device information and change device settings.

As technology has advanced, many of these devices have offered increased functionality at the same or lower cost. For example, climate control, lighting, and other systems can now be programmed to turn on and off and automatically change device settings at different times on different days or in response to other external events. While advancements in processing technologies have resulted in faster and more powerful processors in these electronic devices, cost considerations often limit the capabilities of processors selected for use in electronic devices.

Many end users of electronic devices are not willing to pay the premium required to equip the electronic device with the same processing capabilities as their smart phone or computer. As a result, many electronic devices are equipped with resource-limited processors, such as microcontrollers, that are capable of only performing a minimal set of functions necessary for the user to operate the electronic device. These resource-limited processors used in electronic devices are incapable of running an operating system or even executing basic functions performed by smart phones and other computing systems.

For example, instead of providing an intuitive, graphical user interface as found in many smart phone or web applications, many programmable thermostats require users to cycle through a complex array of menus and submenus with limited feedback on a small display to program the thermostat to set a preset temperature (e.g. 70°) at a preset time (e.g. 5 pm) on a preset day (e.g. each weekday). In addition, several buttons or button combinations may perform different functions depending on the menu further confusing users. For example, the buttons to raise or lower a preset temperature may also be used to change the time in one menu, change a selected mode in a second menu, and change other settings in a third menu.

To avoid including more powerful and costly processors that would enable richer user interfaces, device manufacturers have attempted to simplify user interfaces by consolidating or otherwise limiting device features and functionality. For example, while many programmable thermostats could be configured to support preset temperatures on specific dates of the year, such as January 1 or March 3, few, if any, actually provide this functionality, as it may require additional sets of programmable menus and submenus that may increase the time required to program the thermostat and add to user frustration and confusion. Thus, some manufacturers choose to intentionally limit or restrict features and functionality to make the interfaces simpler to a user and more user-friendly at a given price.

While device manufacturers could upgrade the technology used in the user interfaces of their devices, such an investment may not be practical or cost effective, given the costs of upgrading the technology, the quantities of each device model sold, and the price users are willing to pay for the devices.

As described in detail below, we provide herein technology that facilitates development of intuitive, feature-rich user interfaces for these devices in a cost effective manner by shifting processing functions that cannot be performed by resource-limited processors of the electronic device to an external computing system independent of the device. As part of this technology, we also provide a framework and protocol for enabling bi-directional communication between the electronic device and the device independent computing system.

BRIEF DESCRIPTION OF THE DRAWINGS

FIG. 2 shows exemplary resource definitions in an embodiment of the invention.

FIG. 6 shows exemplary code defining resources in an embodiment of the invention.

FIG. 7 shows exemplary application schema code generated from the defined resource code shown in FIG. 6.

FIG. 8 shows exemplary protocol adapter code generated from the defined resource code shown in FIG. 6.

FIG. 17 shows exemplary resources definitions in a second programming language that is different from that shown in FIG. 2.

FIG. 18 shows exemplary code defining resources in a second programming language that is different from that shown in FIG. 6.

FIG. 19 shows exemplary application schema code generated in a different programming language from that shown in FIG. 7.

FIG. 20 shows exemplary prototype declarations for reading data from and writing data to virtual data objects of the electronic device that are generated from the resource definition code shown in FIG. 18.

FIG. 21 shows exemplary embedded adapter code generated from the resource definition code shown in FIG. 18.

FIG. 22 shows exemplary protocol adapter code generated in a different programming language from that shown in FIG. 8.

DETAILED DESCRIPTION

Figure 1:
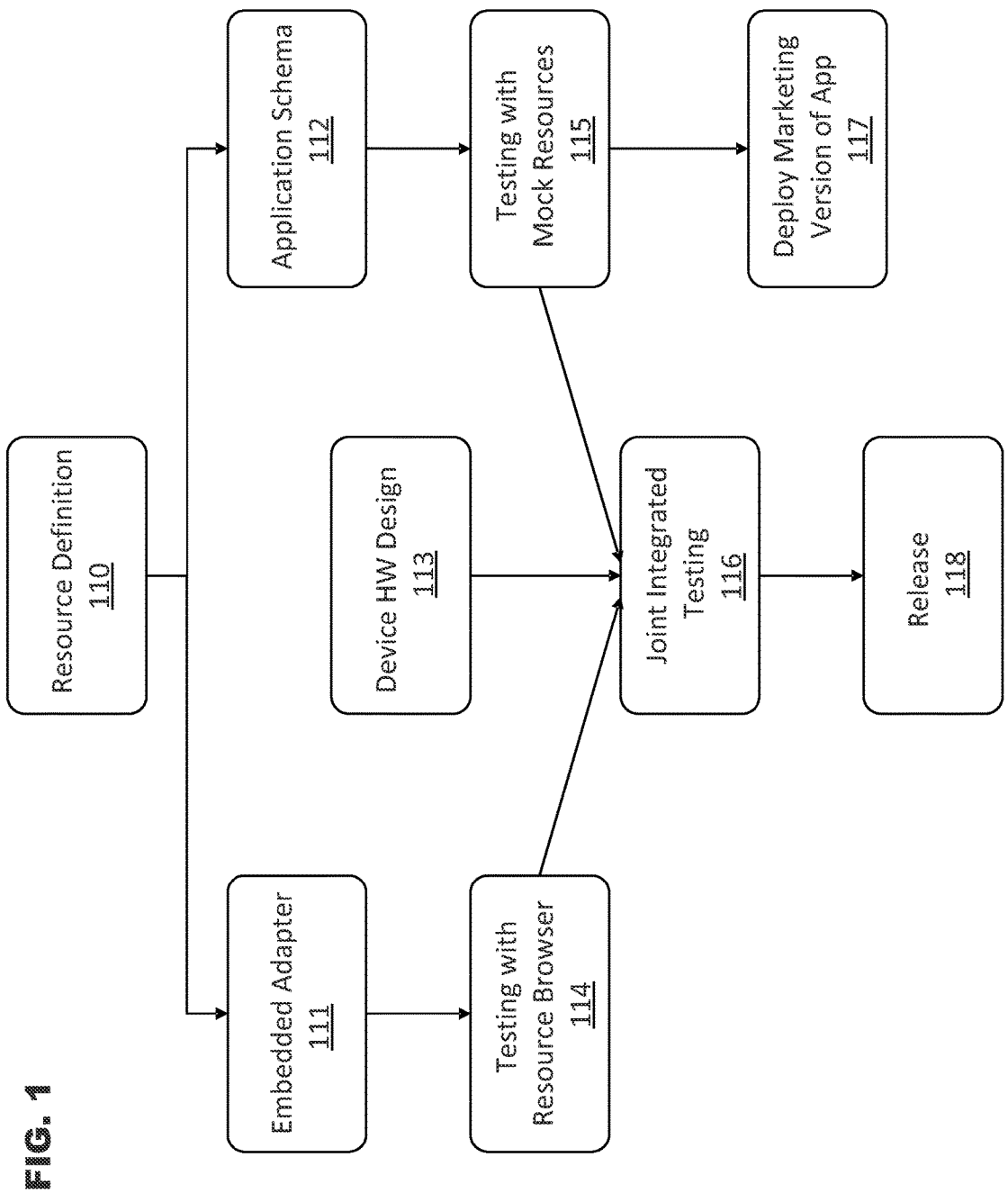
FIG. 1 shows an exemplary workflow in an embodiment of the invention.

In an embodiment, virtual data objects of an electronic device, which may include electro-mechanical components, may be represented as one or more resources. The electronic device may contain a resource-limited processor, such as a microcontroller, capable of only performing a minimal set of functions necessary for a user to operate the electronic device. The resource-limited processor may be incapable of running an operating system or executing basic functions performed by a computing system.

The virtual data objects may include values, variables, functions, data structures, or other entities that may be read from, written to, or manipulated by electronic components in the device that store and/or process data. Thus, each resource may be defined to represent a content of a memory register, an input, an output, a variable, a function, a data structure, or other entity that may be read from, written to, or manipulated by the electronic components of the device.

Once the resources have been defined, a customized application protocol and implementation of the protocol may then be automatically generated and used to facilitate communications between the device and a user computing system executing an application to interact with the device. The syntax and/or semantics of the protocol may be derived from the defined resources, so that the protocol may be uniquely configured for each set of uniquely defined resources. In some embodiments, each resource may have a defined behavior, such as whether the resource is readable from or writeable to the device, though the actual implementation of the resource in the device and in the application executed on the user computing system may be left to the discretion of a programmer, developer, or engineer.

Once defined, these resources may be used by application developers to efficiently create applications running on mobile phones, tablets, and other computing systems that interface with the device. The resources may also be used by the device manufacturer to create programming code enabling reading and/or writing of the values, variables, functions, data structures, or other entities used by the device, so that the applications can interface with the device. Resources may be created and defined for those values, variables, functions, data structures, or other entities of the device that are to be accessed or changed by a device user through a user application installed on a separate computing system of the user.

Once the appropriate resources have been defined, an application schema and an embedded adapter may be generated. The application schema may include each of the resource definitions, which may be transformed and imported into an application development program. Application developers and programmers may then use the application development program with the imported resource definitions from the application schema to quickly create a user application compliant with the resource definitions.

The embedded adapter may include stubs of computer programming code corresponding to each defined resource. The embedded adapter may be generated in C or other programming languages based on criteria specified in the resource definitions. The stubs of code may act as placeholders for a programmer or engineer familiar with the device's structure to write code mapping the fields identified in the resource definitions to corresponding values, variables, functions, data structures, or other entities stored in memory or otherwise used by the device. The mapping may be performed by a programmer or engineer familiar with the hardware configuration of the device as well as the layout, structure, and functionality of the device's memory segments and/or registers.

The embedded adapter may be installed in the device itself, either as additional software integrated into the device or as a combination of both hardware and software. The embedded adapter may be configured to access the mapped segments and registers of the device's memory whenever a request is made at the user application to read or write to a particular resource in the device. Because the embedded adapter and application schema are created from and reference the same defined resources, the mappings in the embedded adapter may be completed independent of any developments efforts to create a user application from the application schema.

The device containing the embedded adapter may also be modified to include a data transmitter, receiver, and communications protocol capable of communicating with a predetermined computing system, to the extent the device does not have such functionality. Once the device and the embedded adapter are operational and the user application has been developed and deployed to a computing system of a device user, the device user may activate the user application.

The user application may then establish a wired or wireless connection with the device using a communications transmitter and receiving device in the user's computing system and communications protocol referred to in the resource definitions. These communication devices and protocols may, in some embodiments, be based on industry standards, such as Wi-Fi®, Bluetooth®, Bluetooth Low Energy®, and so on to facilitate the ease with which different computing systems will be able to establish connectivity with the device. In some embodiments, the invention may operate wholly independent of particular communication devices and respective protocols so that any valid communications device and protocol supported by both the device and user computing system may be used.

Once the user's computing system and the device have established a connection using the communications device and/or communications protocol specified in the resource definitions, data may be exchanged between the device and the computing system. For example, the embedded adapter may read data from the mapped memory segments/registers, assign one of the defined resource values to the read data, and transmit an identifier of the resource and the assigned resource value to the user application using the communications device/protocol. Similarly, resource values in the user application that are updated in the user application may be transmitted with a resource identifier using the communications device/protocol to the embedded adapter. The embedded adapter may identify the memory segment/register corresponding to the identified updated resource through the mappings, convert the updated resource value to format in which the resource value is stored in the memory segment/register, and then store the converted resource value in the mapped memory segment/register.

An exemplary method may include associating, using a processing device, a resource representing a virtual data object of an electronic device with a parameter transmitted according to a connection independent protocol between the electronic device and a user computing system; and implementing the protocol, wherein a transmission of the parameter and a value associated with the parameter according to the protocol enables a transfer of data between the virtual data object of the electronic device and an application of the user computing system providing an interface for an interaction with the virtual data object.

An exemplary electronic device may include a transmitter, a receiver, a virtual data object containing data relating to a functionality of the device, an embedded adapter including a mapping of a plurality of virtual data objects in the device to a plurality of resources, and a protocol adapter implementing a protocol for transferring a parameter and a value associated with the parameter between the device and a user computer system through the transmitter and the receiver and the protocol adapter including a mapping of each resource to a unique parameter in the protocol.

An exemplary user computing system may include a transmitter, a receiver, a processing device, an application, that when executed by the processing device, instantiates an interface in the user computing system enabling a user interaction with virtual data objects in an electronic device, and a user framework to instantiate a connection independent protocol to transfer a parameter and a value associated with the parameter between the user computing system and the electronic device using the transmitter and the receiver, the user framework including a mapping of each virtual data object included in the application interface to a unique parameter in the protocol.

FIG. 1 shows an exemplary workflow in an embodiment of the invention. In box 110, one or more resource definitions may be created. The resource definitions may define values, variables, functions, data structures, or other entities of the device, such as one or more device settings stored in a register or memory of the device. FIG. 2 shows exemplary definitions of time, date, temperature, and scheduling settings that may be stored in a memory of a programmable thermostat. For example, if the programmable thermostat stores current time information in separate hour and minute data fields or registers, with the hours ranging from 0 to 23 and the minutes ranging from 0 to 59, then a currentTime resource 201 may be created and defined as having a structured type 202 with an hour component that ranges from 0 to 23 (shown as HourOfDay.Type) and a minute component that ranges from 0 to 59 (shown as Minute. Type).

If the programmable thermostat also stores current day information as one of seven values representing each day of the week, then a currentDay resource 203 may be created and defined as having an enumerated type 204 with the data stored in the currentDay field limited to and corresponding to one of the seven days of the week.

If the programmable thermostat is capable of storing current temperature information of a temperature in whole number degrees between 20 degrees Fahrenheit and 105 degrees Fahrenheit, then a currentTempInF resource 205 may be created and defined as having a numeric value type 206 with the data stored in the currentTempInF field limited to a minimum value of 20, a maximum value of 105, and any intermediary values that are incremental multiples of 1 above 20 and below 105, such as 21, 22, 23, and so on. If the device includes data that is not intended to be changed by a user, such as current temperature information obtained from a temperature sensor embedded in the thermostat, the resource definition may include a designation of the data associated with the resource as read only.

If the programmable thermostat is capable of storing programmable scheduling information, then a schedule resource 207 may be created. The schedule resource 207, like each of the other resources, may be created based on an existing configuration of the thermostat. Thus, if the programmable thermostat is configured to allow a user to change a temperature four times each day, once at preset time e.g. when the user wakes up, once at a preset time e.g. when the user leaves for work, once at a preset time e.g. when the user returns home from work, and once e.g. when the user goes to sleep, then the schedule resource 207 may be defined accordingly. For example, the schedule resource may include a structured type 209 having four fields, including a wake field, a leave field, a back field, and a sleep field.

Each of the four fields 209 may include a structure type 208 having a start time component and a temperature component specifying the temperature to take effect at the start time. The start time component may be in the format of structured type 202 with an hour component that ranges from 0 to 23 (shown as HourOfDay.Type) and a minute component that ranges from 0 to 59 (shown as Minute. Type). The temperature component may be in the format of a numeric value type 206 with the data being limited to a minimum value of 20, a maximum value of 105, and any intermediary values that are incremental multiples of 1 above 20 and below 105, such as 21, 22, 23, and so on.

Customized resources definitions may be created depending on the device type and other device considerations. For example, creating resources definitions for a clock radio may include a radio frequency resource corresponding to a selected frequency tuning of the clock radio to a particular radio station. The radio frequency resource may be defined as a numeric value type with possible values ranging from 87.5 MHz to 108.0 MHz in 0.2 MHz increments. The clock radio may also include a mode resource defined as an enumerated type with a limited range of four distinct values representing an All Off mode of the clock radio, a Radio On mode, an Alarm Buzzer Only mode, or an Alarm Radio Only Mode.

Different device types and models may store different device settings, options, and data. Even if similar devices store the same data, the data may be represented differently in different device models. For example, one clock radio or thermostat model may store time information in two separate memory registers; the first register may store hour information in a twenty four hour format (0-23) while the second may store minute information. Another clock radio or thermostat model may store time information in three separate registers; the first register may store hour information in a twelve hour format (1-12), the second may store minute information, and the third may be a single bit storing Ante Meridiem and Post Meridiem (AM and PM) information. Providing the user-defined resource definitions enables device manufacturers, programmers, and/or application developers to create customized resources that are representative of how memory is allocated and used by each device.

Once each of the resources has been defined in box 110, a processing device may be used to process the defined resources and generate an embedded adapter in box 111 and an application schema in box 112. The generated embedded adapter may be sent to a programmer, engineer, or other person familiar with the configuration and operation of the device to map the defined resources to corresponding portions of the device's memory storing the data relating each defined resource. In some instances, this person may be an employee or agent of a device manufacturer who assisted in the development of the device. For example, in the case of the climate control system, this may be an engineer who designed the digital thermostat used to operate the system.

The application schema in box 112 may be sent to independent programmers or application developers to create one or more user applications including user interfaces for users of the device to program, configure, or otherwise interact with the device. These independent programmers and developers need not have any specialized knowledge of the device, the device's configuration, or the device's functionality, to create the user applications. The schema, which includes each of the resource definitions in box 110, may include all of the information necessary for the programmers and developers to create the user applications. These programmers and developers may therefore create the user applications independent of any efforts by others to map the defined resources to corresponding portions of the device's memory through the embedded adapter in box 111. Indeed, it is also possible in some embodiments for the programmers and developers to create the user applications even if the device itself has not yet been manufactured.

The embedded adapter in box 111 may include stubs of computer code written in C or some other language. A code stub may be automatically created for each of the resource definitions in box 110. Each of the code stubs may include all of the information necessary for a person familiar with the device's internal memory configuration to map the defined resources to corresponding portions of the device's memory. The programmer, electrical engineer, or other person familiar with the configuration and operation of the device may then create additional code associating and mapping each of the code stubs to respective memory segments in the device. These memory segments may include registers such as data registers, address registers, general purpose registers, and other types of registers. The memory segments may also include other portions of memory or data fields in a data structure.

Just as the application schema in box 112 may include all of the information necessary for the programmers and developers to create the user applications without requiring any additional knowledge about the device, the embedded adapter in box 111 may also include all the information necessary for the person mapping each of the code stubs to do so without knowing anything about the user applications. Thus, the programming of the embedded adapter by those with knowledge of the device and the user application development by others may be performed wholly independently of each other. This not only saves time, since both tasks can be performed in parallel, but also enables user applications to be developed quickly and efficiently since the application developers need not have any prior knowledge of the device or its functionality.

While the user applications are being developed and while the code stubs in the embedded adapter are being mapped, the hardware in the device itself may be redesigned in box 113 to accommodate the embedded adapter code so that the adapter code may access the mapped sections of the device's memory.

The hardware in the device may also be redesigned in box 113, if necessary, to include a transmitter and/or receiver capable of transmitting data to and receiving data from a computing system, such as a mobile phone or tablet, executing the user applications developed from the application schema in box 112. This modification to the device hardware may be necessary to enable the user application, through the host computing system, to communicate with the device and configure the device by reading and writing data from and to the device's memory. If the device already includes such a transmitter and receiver that are compatible with a transmitter and receiver of the host computing system, then the included transmitter and receiver may be used for communications with the computing system executing the user application. The transmitter, receiver, and/or the communications protocol used to send and receive data between the device and the computing system executing the user application may also be specified as part of the resource definitions in box 110 so that device and the computing system are able to communicate. In an embodiment, the transmitter, receiver, and the communications protocol may be selected from a set of industry standards, such as Bluetooth®, Bluetooth Low Energy®, Wi-Fi®, and others.

When programming the mappings of the embedded adapter to enable the reading and/or writing of data in the device's memory, a resource browser in box 114 may be used to assist in troubleshooting. The resource browser may include a simulated user interface screen of a user application and a simulated indication of memory values in the device's memory. As each of the mappings is configured, the resource browser may implement the mappings to show the effects of the mapping on the memory values and in the user application. Each of resource definitions may include a default value, which is shown in FIG. 2 as a mockDefault property.

For the example shown in FIG. 2, the simulated user interface screen in the resource browser may show each of the resources, with the corresponding default values. Thus, the current time shown in the simulated user interface screen may show 10:30, the current day may show as Monday, the current temperature as 75°, and so on.

The simulated memory values of the device's memory may show the results of the corresponding memory mapping added to the embedded adapter. Thus, if the hour in the current time is stored in a five bit register of the device having values 00000 (representing the midnight hour) to 10111 (representing 11 PM), and the mapping was programmed correctly, the simulated memory value for the hour resource should show the value 01010 (representing 10 AM). Similarly, if the current day is stored in a three bit register having values 000 (representing Sunday) to 110 (representing Saturday), the simulated memory value for the current day should show the value 001 (representing the default value Monday) if the mapping was programmed correctly. The resource browser may also show the effect on simulated memory values of any corresponding changes to resource values made in the simulated user interface screen. If the mappings were not programmed correctly, the simulated memory values may show other erroneous values, which may assist the mapping programmer in discovering and correcting any programming errors.

The programmed default values may also be used to troubleshoot user applications developed from the application schema of box 112, by testing using mock resources in box 115. Since the user application is not actually communicatively connected to the device during this testing process, the application is not able to actually read or write any data values from or to the device. Thus, in the case of a user application for a thermometer device, where the user application includes a data field displaying the current room temperature at reported by the thermometer, an error from the user application failing to successfully read the current room temperature from the thermometer memory during the testing process. To avoid this, the default values specified in the resource definitions may be substituted for the values (mock values) that would otherwise be read from the device's memory. Thus, in the example shown in FIG. 2, the user application may display the current temperature in the user application as 75°, which is the value specified in the mockDefault property, as though the value was actual stored in the device's memory (mock resources). This functionality may enable an application developer to test and troubleshoot the user application without any actual connectivity to the device itself.

Once the development of the user application is complete, a marketing version of the user application may be deployed or otherwise distributed to potential users in box 117. The marketing version may be non-operational, in that the user application may not actually communicate with the intended device. Instead, the marketing version may use the default values included in the resource definitions to simulate actual communications with the intended device. The marketing version may assist in promoting sales of the device or providing training in the use of the user application. The marketing version may assist in promoting sales because potential customers using the marketing version may explore the full functionality of the user application and learn of additional features that differentiate the device from its competitors. The marketing version may also be used to provide training in that it provides an environment in which a user is free to explore and test all of the features and functionality offer by the user application without having to worry of any actual consequences since the marketing version need not be capable of communication with any actual devices and can be operated in a mode that does not so communicate or that provides simulation only. The marketing version may "control" a simulated device, the actions of which may be illustrated or animated on a display.

Both the non-operational marketing and the fully operational released versions of user applications may be useful for testing, design feedback, and other purposes. For example, deploying the user application to a group of testers may allow the testers to run through different scenarios and report any application errors discovered while testing these scenarios.

The marketing version and/or the fully operational and released version may also be deployed with a tracking, monitoring, or remote connection function. These functions may enable the application developer or other interested party to track use of the user application. This may be useful to learn which features are actually used, and under what circumstances, to improve future versions of the user application. An operational version with limited capabilities may also be provided to restrict certain functions to one or more subgroups of users.

The functions may also enable remote diagnostics and troubleshooting. For example, remote access may be used to assist a user experiencing problems with the application or the device. The remote diagnostics features may automatically send a message to the manufacturer, application developer, or other third party if any errors or abnormal events are detected or reported by the device or the user application.

Once the embedded adapter mapping, user application development, and device hardware design are all complete, a final integrated testing in box 116 may be conducted. During the integrated testing, the embedded adapter with completed mappings may be included in the device, along with the appropriate transmitter, receiver, and communications protocol, if it was not already included. The completed user application may also be included in the computing system, along with the appropriate transmitter, receiver, and communications protocol, if it was not already included. The device and user application on the computing system may then be activated, and testing may commence to see whether the user application is actually able to read from and/or write to the device's memory to configure, program, or otherwise interact with the device.

Once testing is complete, each of the components may be finalized, and a final version of the user application may be released in box 118. Similarly, the finalized hardware design of the device, including an operational version of the finalized embedded adapter with completed mappings, may also be released in box 118. Purchasers and/or users of the device may then download or otherwise install the user application to a compatible computer system to begin using the user application to monitor, control, or otherwise interact with the device through the user application.

In some instances, multiple user applications may be created for the same device. For example, a device manufacturer may freely distribute the application schema in box 112 to third party application developers to promote competition by encouraging the third party developers to develop their own user applications. The device manufacturer may permit the application developers to charge a fee to users seeking to download the user application, and may also collect a royalty or engage in another type of fee arrangement with the developers.

To ensure quality and maintain security, the device manufacturer may require that user applications developed by third parties be reviewed and approved by the manufacturer or other party prior to being released to consumers. As part of these procedures, the device manufacturer or other third party may require that all approved user applications be secured through the use of digital signatures, encryption, or other techniques in order for the device to communicate with the user application. This may be done to prevent tampering and provide quality control, among other reasons.

The application schema in box 112 may be used in some embodiments to create user applications for several different computing system devices and operating systems. For example, the application scheme may be used to develop a user application for a first set of mobile devices running an Android-based operation system, a second set of mobile devices running an iOS-based operating system, and a third set of mobile devices running another operating system. To ensure that user applications can be quickly developed for each of these different operating systems and devices at minimal cost, the application schema may be created as a text or other file that may be imported into an application development program for one or more of the different devices and operating systems. The application scheme may also be created in a Standard Generalized Markup Language (SGML), such as an eXtensible Markup Language (XML) which may then be imported into other application development programs.

In some instances, user applications may permit devices that are each controlled by the computing system, but that do not interact with each other, to function in a coordinated manner. For example, an operable skylight with a rain sensor that triggers closure of the skylight in the event of precipitation could provide notification of such action to the computing system, which then may turn off outdoor lawn sprinklers.

In some embodiments, the application schema may be designed to be used in a generic application development program. The generic program may enable developers to design generic user applications while specifying specific properties or functionality for particular devices. The generic program may then compile the generic user application for one or more specific devices and/or operating systems using the supplied properties and functionality for particular devices to as needed.

Figure 3:
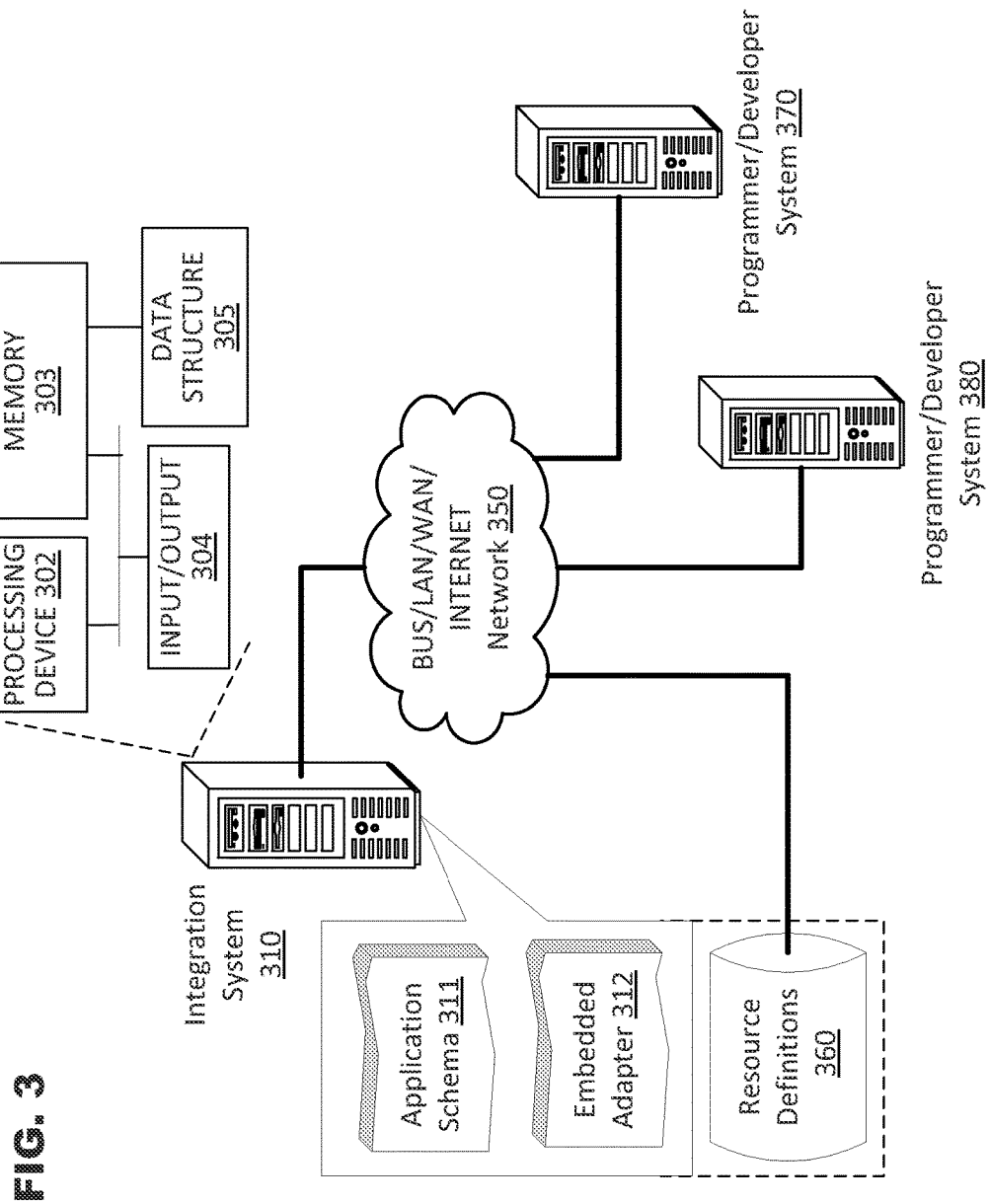
FIG. 3 shows an exemplary architecture in an embodiment of the invention.

FIG. 3 shows an exemplary architecture in an embodiment of the invention. Integration System 310 may retrieve created resource definitions from a resource definition data structure 360 and generate an application schema using an application schema generator module 311 and an embedded adapter using an embedded adapter generator module 312 based on the retrieved resource definitions. The generated application schema and embedded adapter may then be sent to one or more programmer/developer systems 370 and 380 through a network 350. The programmer/developer systems 370 and 380 may include application development and testing programs to assist in user application development, including a resource browser for testing embedded adapter mappings and/or user applications.

Network 350 may include a LAN, WAN, bus, or the Internet. Integration system 310 may be a single integrated system or it may be made up of several separate systems that collectively perform the functions described. For example, the resource definitions data structure 360 may be a part of the single integration system 310 in one embodiment, or it may be a separate standalone system in an embodiment that is connected to the integration system 310 through network 350. The resource definition data structure 360 may be stored on computer readable media capable of storing data, such as a hard disk drive, flash memory, or other computer readable media, and may also be a component of a larger system.

Each of the systems and devices in FIG. 3 may contain a processing device 302, memory 303 storing loaded data or a loaded data structure 305, and a communications device 304, all of which may be interconnected via a system bus. In various embodiments, each of the systems 310, 360, 370, and 380 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

Communications device 304 may enable connectivity between the processing devices 302 in each of the systems and the network 350 by encoding data to be sent from the processing device 302 to another system over the network 350 and decoding data received from another system over the network 350 for the processing device 302.

In an embodiment, memory 303 may contain different components for retrieving, presenting, changing, and saving data. Memory 303 may include a variety of memory devices, for example, Dynamic Random Access Memory (DRAM), Static RAM (SRAM), flash memory, cache memory, and other memory devices. Additionally, for example, memory 303 and processing device(s) 302 may be distributed across several different computers that collectively comprise a system.

Processing device 302 may perform computation and control functions of a system comprising a suitable central processing unit (CPU). Processing device 302 may include a single integrated circuit, such as a microprocessing device, or may include any suitable number of integrated circuit devices and/or circuit boards working in cooperation to accomplish the functions of a processing device. Processing device 302 may execute computer programs, such as object-oriented computer programs, within memory 303.

Figure 4:
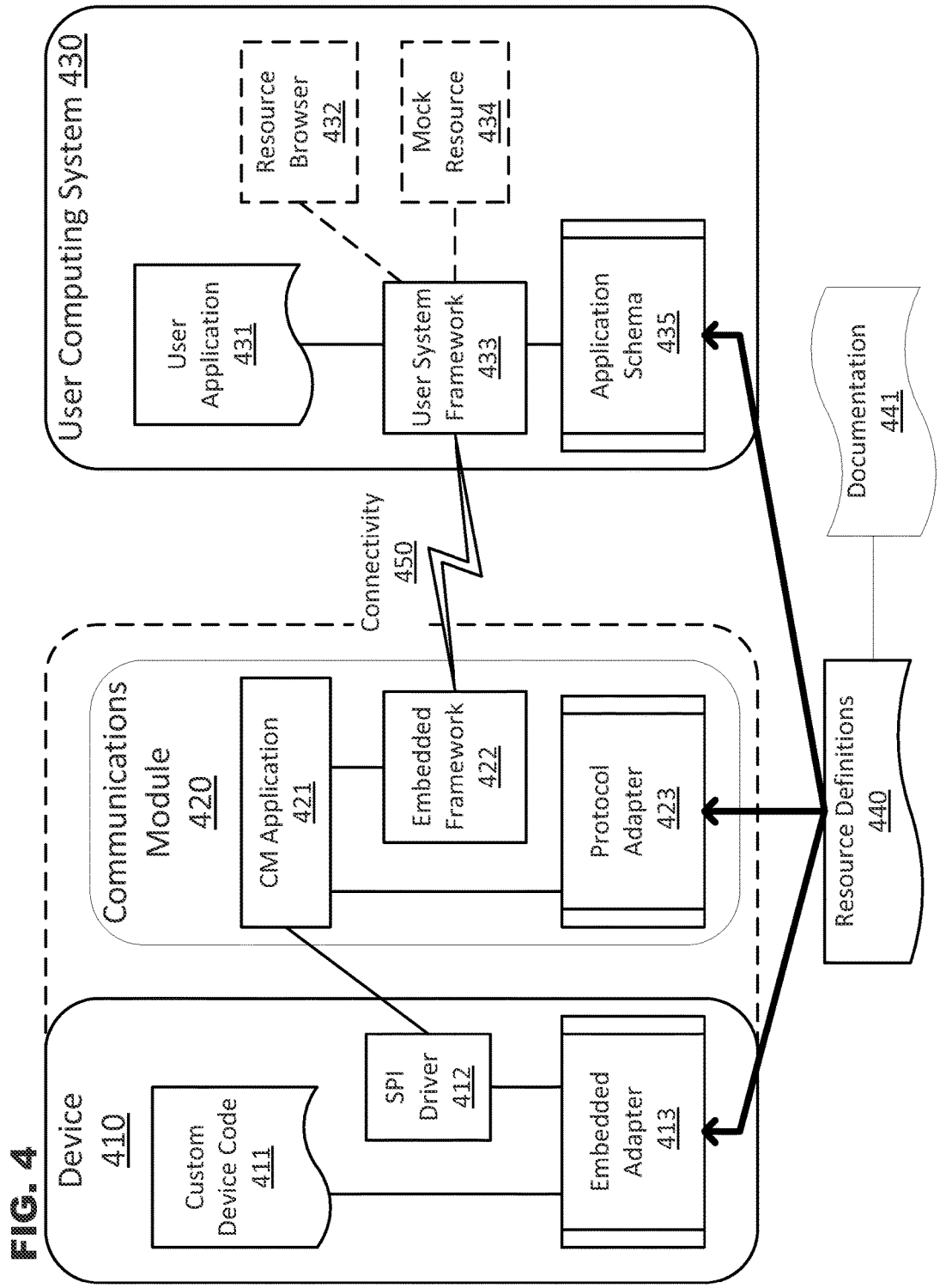
FIG. 4 shows an exemplary interactivity of different components in an embodiment of the invention.

FIG. 4 shows an exemplary interactivity of different components included in a device 410, communications module 420, and user computing system 430 in an embodiment of the invention. Device 410 may include custom code 411, a serial peripheral interface (SPI) driver 412, and/or an embedded adapter 413. In some embodiments, communications module 420 may also be included within a housing of the device 410, though in other embodiments the communications module 420 may be an add-on component communicatively connected to the device 410. Communications module 420 may include a communications module application 421, embedded framework 422, and/or a protocol adapter 423. User computing system 430 may include a user application 431, resource browser 432, user framework 433, mock resources 434, and/or application schema 435.

A device 410, such as a thermostat, appliance, tool, or other device, may be connected to communications module 420 to enable communications between the device 410 and the user computing system 430. The device 410 may be communicatively coupled to the communications module 420 through a serial link enabling the exchange of data between a communications module application 421 in the communications module 420 and a serial peripheral interface (SPI) driver 412 in the device 410. The SPI driver 412 may also redirect data to one or more inputs, outputs, registers, and/or memories of the device 410 in order to read data values from and/or write data values to the device 410.

The embedded adapter 413, which may be automatically generated from a set of defined resources 440, may provide stubs of code for each defined resource. A programmer, engineer, or person may then create customized device code 411, which may be inserted at each code stub to associate each of the communicatively coupled inputs, outputs, registers, and/or memories of the device 410 with a corresponding defined resource.

The communications module 420 may include a transmitter and receiver capable of sending data to and receiving data from the user computing system 430. In some embodiments, the communications module 420 may be configured to support connectivity 450 with the user computing system 430 through one or more connectivity standards, such as Bluetooth® and/or Wi-Fi®. In some instances, the communications module 420 may include a core integrated circuit CC2540 transceiver to support Bluetooth Low Energy® connectivity or a CC2560 transceiver to support Bluetooth® connectivity.

The communications module application 421 may interface with an embedded framework 422 and a protocol adapter 423 to communicate with its counterpart user framework 433 in the user computing system 430 using a connectivity standard supported by both the user computing system 430 and the communications module 420.

The embedded framework 422 and the user framework 433 may instantiate a connection independent communications protocol used to transmit data between the user computing system 430 and the communications module 420 through the supported connectivity standard. The protocol adapter 423 in communications module 420 and the application schema 435 in the user computing system 430 may specify the syntax and/or semantics of this communications protocol.

The embedded framework 422 may encode data received from the communications module application 421 to be sent to the user computing system 430 and decode data received from the user computing system 430 to be sent to the device 410 according to the syntax and semantics specified in the protocol adapter 423. Similarly, the user framework 433 may encode data received from the user application 431 to be sent to the device 410 and decode data received from the embedded framework 422 to be sent to the user application 431 according to the syntax and semantics specified in the application schema 435. Since protocol adapter 423 and application schema 435 may both be generated from the same resource definitions, the syntax and semantics may be generated to be consistent in both the protocol adapter 423 and the application schema 435 without any additional intervention or synchronization.

In some instances the user application 431 may be configured to operate as a stand alone application in the user computing system 430 that need not connect to the device 410. In these instances, mock resources 434 may be included in the user computing system 430 and linked to the user framework 433 so that any requests to read from or write to the device 410 are routed to the mock resources 434 instead of the device 410. The mock resources 434 may therefore act as an internal substitute for external connectivity to device 410.

In some instances, the mock resources 434 may also include a set of one or more default values that may be initially provided to the user application 431. The default values may be provided to the user application 431 in response to an initial read request from the user application 431. The mock resources 434 may also be capable of storing any changed values, such as values that are changed through the user application 431.

In some instances where the user application 431 has not been developed or is not operational, a resource browser 432 may be included in the user computing system 430 and linked to the user framework 433. The resource browser 432 may provide a simplified, generic interface substituting for the user application 431. The resource browser 432 interface may enable viewing and/or changing of device settings defined as resources 440 and included in the generated application schema 435. Including the resource browser 432 in the user computing system 430 may permit testing of the connectivity between the user computing system 430, the communications module 420, and/or the device 410 as well as testing the ability to properly read data from and/or write data to the device independent of the user application 431.

The defined resources 440 may also be used in some embodiments to generate documentation 441 that may provide additional information about the operation of the device 410, user application 431, application schema 435, and other components to developers, programmers, engineers, users, and others. Documentation 441 may be used to facilitate development efforts of those providing the user application 431, the custom device code 411, and/or those responsible for testing. The documentation 441 may include a summary of each of the defined resources 440, along with a list of one or more acceptable values and formats for each resource. The documentation 441 may also include any comments or notes included in or otherwise associated with the defined resources 440 or the device 410.

Figure 5:
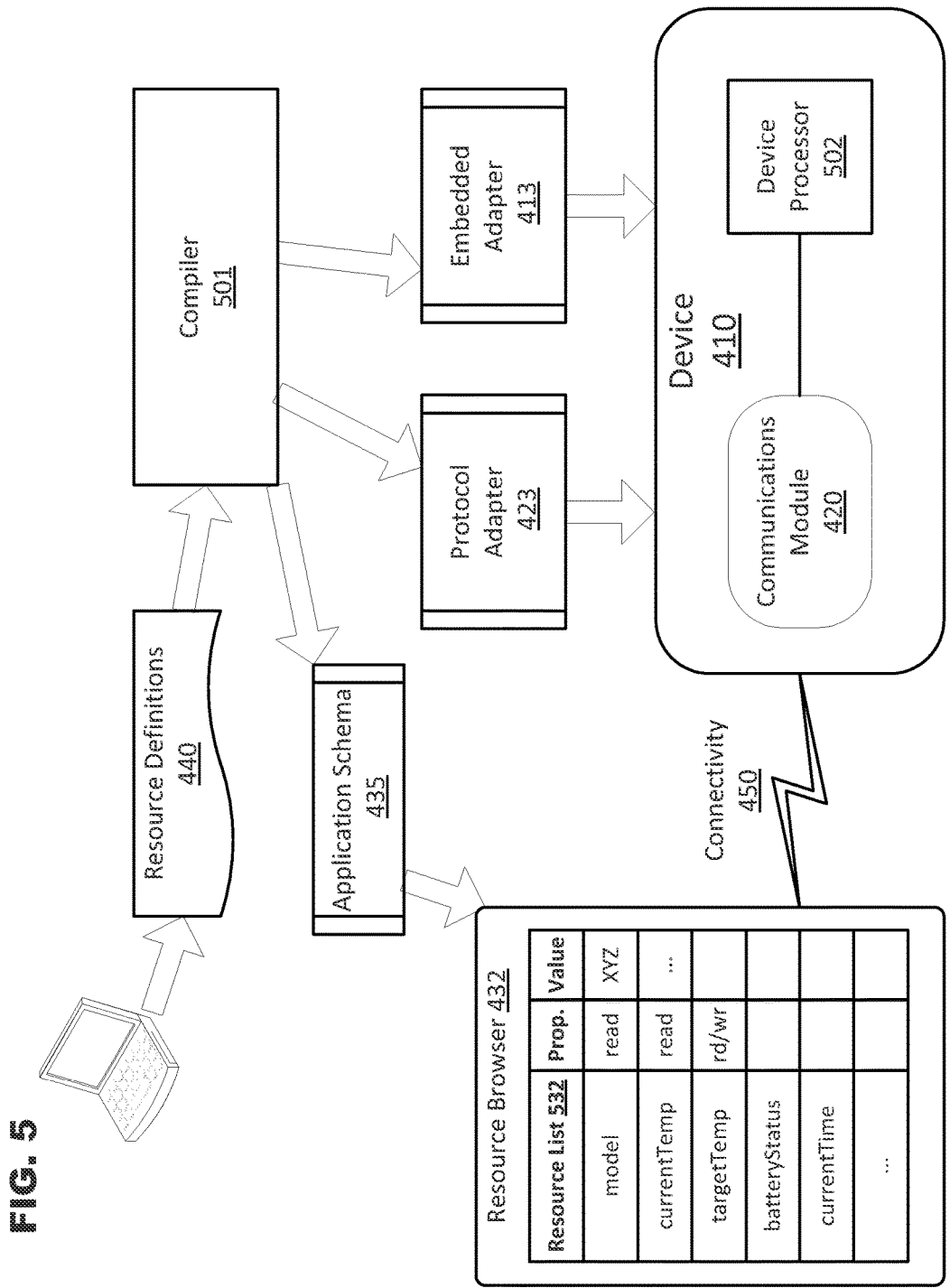
FIG. 5 shows an exemplary operation of the resource browser in an embodiment of the invention.

FIG. 5 shows an exemplary operation of the resource browser 432 in an embodiment. First, one or more resources may be defined 440 and sent to a compiler 501. The compiler 501 may use the defined resources 440 to generate the application schema 435 that may be included in the user computing system 430, a protocol adapter 423 that may be included in the communications module 420, and an embedded adapter 413 that may included in or interface with a component of the device 410, such as a device processor 502. In some embodiments, the testing process may begin once the customized device code 411 associating each of the communicatively coupled inputs, outputs, registers, and/or memories of the device 410 with a corresponding defined resource has been added to the code stubs in the embedded adapter 413.

The testing may begin by launching the resource browser 432, which may be included in the user computing system 430. The resource browser 432 may interface with the application schema 435 to display a list of resources 532 specified in the application schema 435. The resource browser 432 may also display properties and/or values associated with each resource in the list 532. The displayed properties may include read/write properties, size information, type information, and/or other information included in the application schema 435. The values associated with each resource may be obtained from the device 410 through the connectivity 450, the protocol adapter 423 and/or the embedded adapter 413. A device processor 502 may perform read/write operations in the device 410 and transmit a result to the resource browser 432 through communications module 420 and connectivity 450. The results and/or values reported in the resource browser may then be used to perform diagnosing, testing, and debugging.

FIG. 6 shows exemplary code 600 in an embodiment defining resources 440 associated with a blinking device capable of flashing a light on and off at different rates. Once the resources used by the device 410 have been defined 440, as, for example, previously discussed, the defined resources 440 may be used to generate an embedded adapter 413, a protocol adapter 423, an application schema 435, and documentation 441. In the example shown in FIG. 6, the defined resources 440 include references to delay field 601 and counter field 602, which are both readable and writable fields controlling the flashing, a write only input 603 to start or stop the blinking device, and a read only output 604 identifying whether the light is on or off.

FIG. 7 shows exemplary application schema code 700 generated in the JavaScript Object Notation (JSON) interchange standard from the defined resource code shown in FIG. 6. In other embodiments, the application schema 435 may be generated to be compliant with different standards and languages. The application schema code 700 may identify each of the resources 701, properties 702 of each resource, and acceptable values 703 associated with each resource. An application developer may then use this information to create a user application 431. The user application 431, the application schema 435, and a mobile framework may be installed on the user computing system 430.

The user system framework 433 in the user computing system 430 and its counterpart, the embedded framework 422 in the communications module 420 may implement a communications protocol to enable an exchanging of data between the user computing system 430 and the communications module 420 of the device 410 through a supported connectivity 450.

The application schema 435 and the protocol adapter 423, which may both be generated from the same resource definitions 440, may each specify the syntax and semantics of the implemented communications protocol. FIG. 8 shows exemplary protocol adapter code 800 generated from the defined resource code 600 shown in FIG. 6. The exemplary code 800 in FIG. 8 includes a fetch function 801 to retrieve data from a device 410 and a store function 802 to send data to the device 410.

The protocol adapter code 800 in FIG. 8, for example, also provides two parameters, an id parameter 803 and a buf parameter 804, for the fetch 801 and store 802 functions. These functions and parameters may define, for example, some of syntax and semantics of this communications protocol. The id parameter 803 may be a numeric identifier corresponding to a defined resource (i.e. 1 represents the cmd resource 603, 2 represents the count field 602, 3 represents the delay field 601, and 4 represents the field 604 identifying whether the light is on or off), and the buf parameter 804 may include a value associated with the defined resource specified in the id parameter.

The protocol adapter code 800 may be used by the embedded framework 422 to encode data received from the device 410 and transmit the encoded data to the user system framework 433 and to decode data received from the user system framework 433 and transmit the decoded data to the device 410.

The application schema 435 may also include syntax and semantic information for the communications protocol used to exchange data with the embedded framework. In FIG. 7, for example, the application schema code 700 also associates the different resources with the same numeric identifiers in the id parameter as in the protocol adapter code (i.e. 1 represents the cmd resource 503, 2 represents the count field 502, 3 represents the delay field 504, and 4 represents the field identifying whether the light is on or off). The code in FIG. 7 also specifies a range of values that may be associated with each resource.

The application schema code 700 may therefore be used by the user system framework 433 to encode data received from the user application 431 and transmit the encoded data to the embedded framework 422 and to decode data received from the embedded framework 422 and transmit the decoded data to the user application 431.

Figure 9:
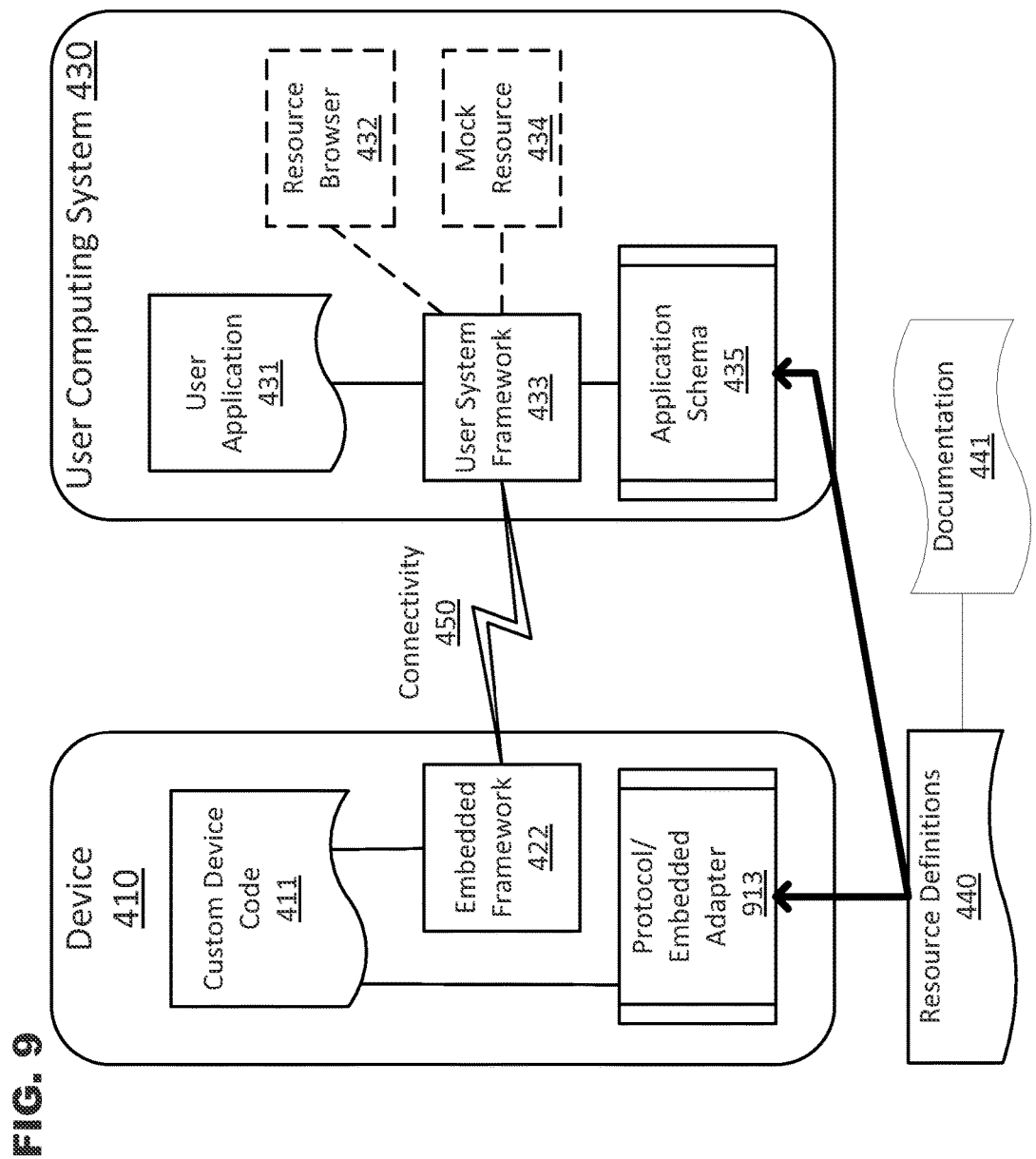
FIG. 9 shows an alternate exemplary interactivity of components in an embodiment of the invention.

FIG. 9 shows an alternate exemplary interactivity of components in an embodiment different to that shown in FIG. 4. The interactivity shown in FIG. 9 may apply if the device 910 already includes hardware and functionality to support connectivity 450 to the user computing system 430. In these instances, the communications module 420 and/or other components such as the SPI driver, need not be implemented or supported. Instead, a single consolidated protocol/embedded adapter 913 may be generated from the defined resources 440.

The consolidated adapter 913 may include the code stubs included in embedded adapter 413 where the customized device code 411 associating each of the communicatively coupled inputs, outputs, registers, and/or memories of the device 410 with a corresponding defined resource may be inserted. The consolidated adapter 913 may also include the syntax and semantics specified in the protocol adapter 423 that may be used by the embedded framework 422 to encode data received from inputs, outputs, registers, and/or memories of the device 410 to be sent to the user computing system 430 and decode data received from the user computing system 430 to be sent to the inputs, outputs, registers, and/or memories of the device 410 using the device's 410 supported connectivity 450.

The components of the user computing system 430, including, for example, the user application 431, resources browser 432, user framework 433, mock resources 434, and/or application schema 435 may function similar to those in FIG. 4. As shown in FIG. 9, using an existing supported connectivity in a device may reduce the number of components, resulting in fewer potential sources of errors, less debugging and testing time, and faster turnaround.

Figure 10:
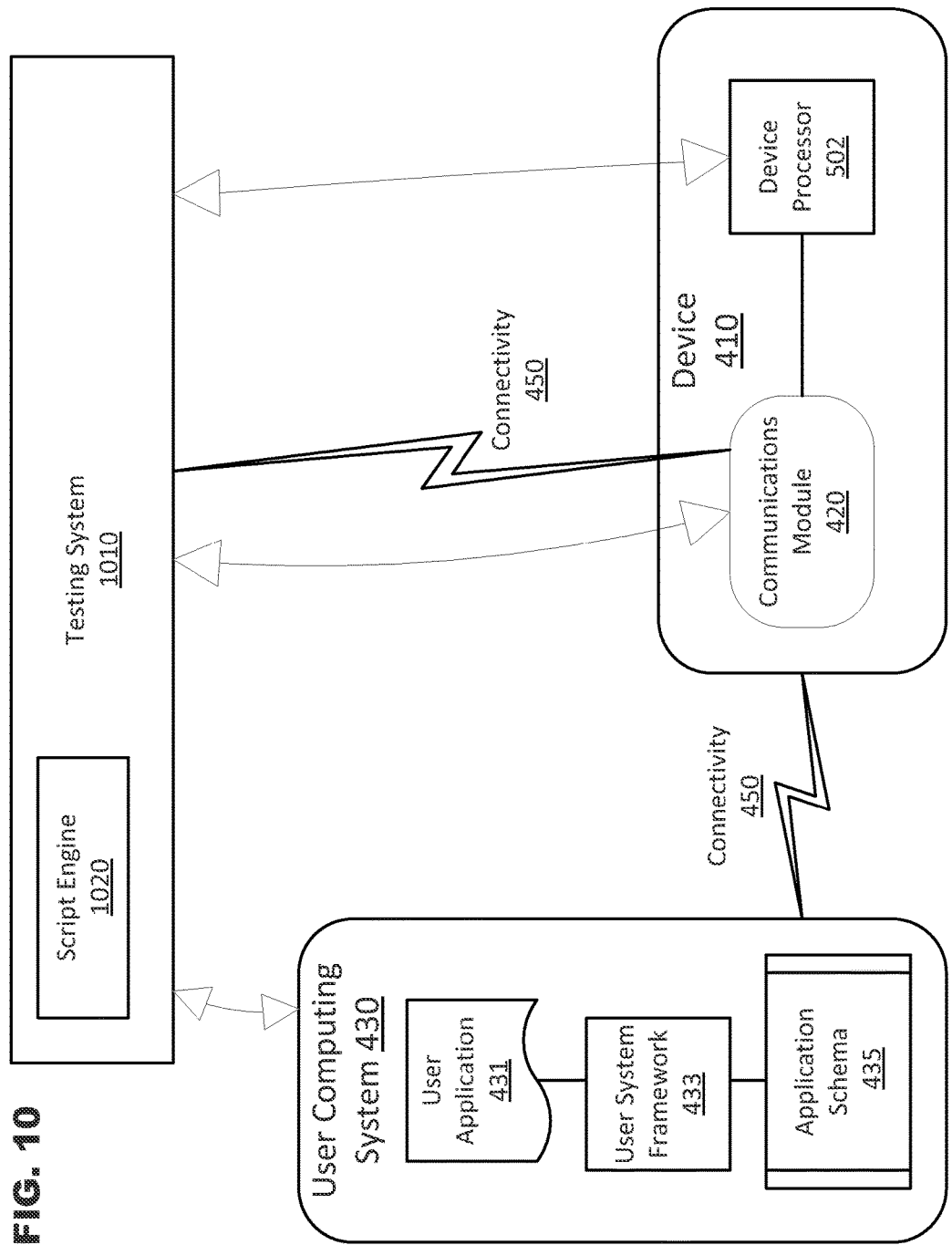
FIG. 10 shows an embodiment for performing automated testing using scripts.

FIG. 10 shows an embodiment for performing automated testing using scripts. A testing system 1010 may be connected to at least one of a user computer system 430, a communications module 420, and/or a device processor 502. A universal serial bus (USB®) connection may be used in some embodiments to establish connections with the testing system 1010, though other types of connections may be used in other embodiments. The testing system 1010 may also be equipped with a transceiver that may be used to establish connectivity 450 with the communications module 420 and/or other components similar to the way connectivity 450 may be established between the user computing system 430 and the device 410. The testing engine may include a test script engine 1020 that may execute testing scripts to perform a series of predetermined tests on one or components.

For example, the testing script may specify that each writeable resource is to be assigned each valid value through the user application, which, if programmed correctly, should cause the changed values to effect a change in the device's settings and/or operation after being transmitted to the device 410 through connectivity 450 and mobile communication module 420. The testing system's 1010 connections to the communications module 420 and device processor 502 may be used to verify each of the resulting changes in the different components of device 410.

Scripts of the testing system 1010 processed through the test script engine 1020 may also be used to perform multiple checks of individual components. For example, the scripts may perform various repeated checks of the connectivity 450 between user computing system 430 and the communications module 420 using the connections between the testing system 1010 and the computing system 430 to initiate and then verify data transmissions between the user computing system 430 and the communications module 420 through connectivity 450.

The test script engine 1020 may both execute test scripts and report the results of running each script. The testing system 1010 may also include additional testing, debugging, and diagnostic tools customized for different computing systems 430. In some instances, the device 410 may be replaced with an application development board that is configurable by the testing system 1010. The application development board may be designed to communicate with the user computing system 430 in place of the device 410 during testing and may be designed to provide additional diagnostic and debugging tools to perform more comprehensive and thorough testing of user application 431, user framework 433, application schema 435, and the connectivity 450 between the user computing system 430 and the device 410, such as by recording each event and data change in the application development board.

Figure 11:
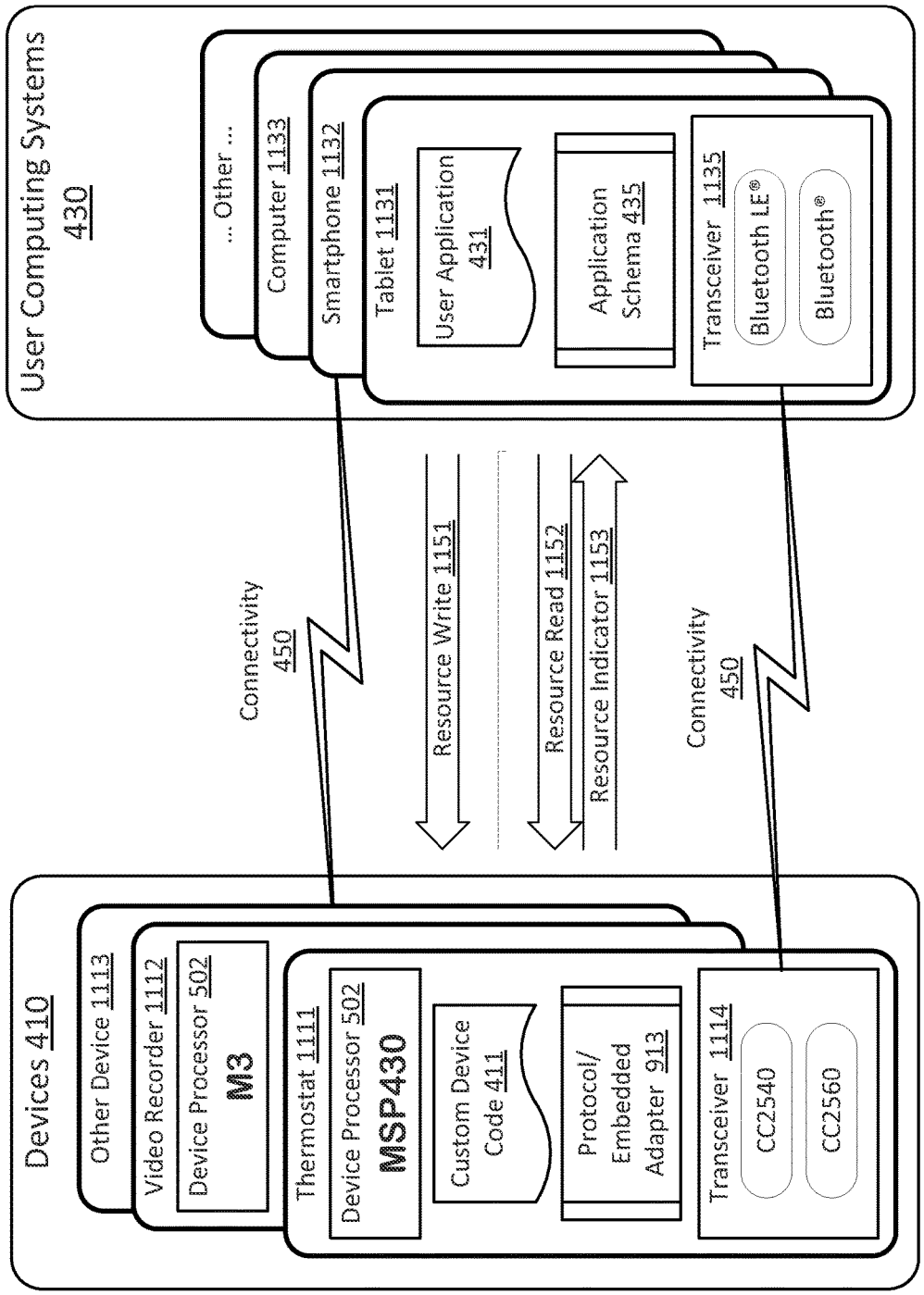
FIG. 11 shows an overview of the connectivity provided between user computing systems and devices in an embodiment of the invention.

FIG. 11 shows an overview of the connectivity provided between user computing systems 430 and devices 410 in an embodiment of the invention. User computing systems 430, such as tablets 1131, smartphones 1132, laptops 1133, and other computing systems may each include a user application 431 customized for the particular computing system, and an application schema 435 generated from a set of resource definitions. Each of the computing systems 1131 to 1133 may also include a transceiver 1135 capable of communicating with at least one device 410. In some instances, the transceiver 1135 may be a Bluetooth®, Bluetooth Low Energy®, or other standard transceiver.

After the transceiver 1135 in the user computing systems 1131 to 1133 establishes connectivity with the corresponding transceiver 1114 in a predetermined device 1111 to 1113, the user application 431 may then cause resource write 1151 and/or resource read 1152 requests to be sent to the predetermined device 1111 to 1113. In response to a write request 1151, the processor or controller of the predetermined device 1111 to 1113 may then write, store, or otherwise configure the device 1111 to 1113 to implement the resource value specified in the write request 1151. In response to a read request 1152, the processor or controller of the predetermined device 1111 to 1113 may retrieve or determine the requested resource value and send an indication 1153 of the resource value to the user application 431. In some instances, the processor or controller of the predetermined device 1111 to 1113 may transmit indications 1153 of resource value to the user application 431 without first receiving a read request 1152 from the user application 431.

Devices 410, such as thermostats 1111, video recorders 1112, and other electronic or electro-mechanical devices 1113, may each include a protocol and/or embedded adapter 913, 413, and/or 423, custom device code 411, and a device processor 502. The device processor may include different types of processing devices, such as, for example, the MSP430 from Texas Instruments®, or the Cortex® M3 processor. Each device 1111 to 1113 may also include a transceiver 1114 to establish connectivity 450 with the transceiver 1135 in the corresponding user computing system 1131 to 1133.

The protocol and/or embedded adapter 913, 413, and/or 423, custom device code 411, and/or transceiver 1114 may be housed separately from the device 410 in a portable dongle, adapter, or stand alone housing, which may include a memory and may be communicatively coupled to the device 410. In some instances, this communicative coupling may occur through a USB®, Ethernet, or other type of wired or wireless connection. In some instances, a device driver may be provided to the device 410 to enable the device 410 to interact with the protocol and/or embedded adapter 913, 413, and/or 423, custom device code 411, stored in the memory of the portable dongle, adapter, or stand alone housing.

As shown in FIG. 11, each device 1111 to 1113 may include a different type of processing device 502, such as the MSP430 or the M3 processor. Each of these processing devices 502 may specify different criteria and formats for processing data. For example, one processing device 502 may use 16-bit integer types when processing smaller order integers while another may use 8-bit or 32-bit types. Other data types, such as real numbers, which may include non-integer components, may also be processed differently by different processing devices 502. To account for the different processing formats and criteria a set of encoding and decoding instructions for each type of processing device 502 may be created.

In an embodiment, these encoding and decoding instructions may be pre-generated for various types of processing devices 502. The type of processing device 502 used by a device 410 may then be specified as part of the resource definitions 440. Once the type of processing device 502 has been specified, the pre-generated encoding and decoding instructions for that processing device type may be retrieved and subsequently used to properly encode data sent to the processing device 502 through the embedded adapter 413 or 913 and decode data received from the processing device 502. In some instances the pre-generated encoding and decoding instructions may be exported to the device 410 separately from but still linked to the other components, such as the embedded adapter 413 or 913. In other instance the pre-generated encoding and decoding instructions may be integrated into the other components, such as the embedded adapter 413 or 913.

Figure 12:
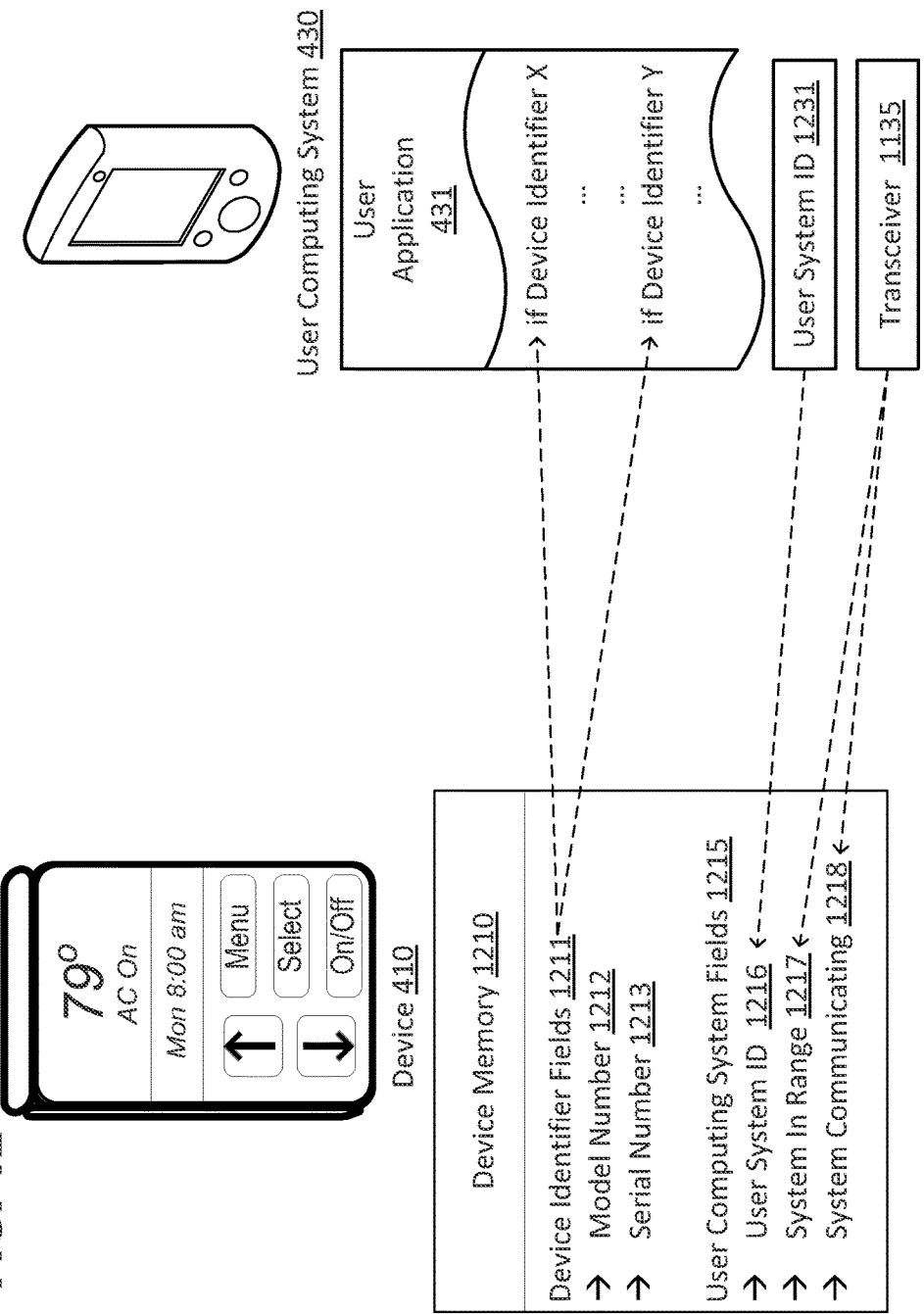
FIG. 12 shows additional data that may be stored in various embodiments.

FIG. 12 shows additional data that may be stored in a memory 1210 of a device 410 to provide additional functionality in various embodiments. For example, the memory 1210 of the device may include a device identifier field 1211. Device identifier fields 1211 may be used to store information about the device and/or the device's capabilities. For example, device identifier fields 1211 may store model number information 1212 or serial number information 1213. They may also store other device information, such as a firmware version number. This information may then be subsequently accessed by a user application 431 on a user computer system 430 to ensure that the capabilities provided by the user application 431 match those of the device 410.

In some instances, it may be desirable to create a single user application 431 that may be capable of communicating with a variety of different devices 410. For example, a climate control system manufacturer may offer several different thermostat variants. Each of these models may provide different features and functions. One may support multi-zoned heating and cooling, another may support seven day programmable temperature settings, and a third may support weekday and weekend programmable temperature settings.

To avoid the additional expense of creating and maintaining separate user applications 431 for each of these models, the application schemas 435 for each thermostat variant may be consolidated, integrated, or otherwise grouped together as part of a single user application 431. The user application 431 may then be programmed to use the device identifier field 1211 data to present the user with the appropriate features corresponding to the user's particular device.

For example, if the device identifier field 1211 specifies a device variant that supports multi-zoned heating and cooling, then the user application 431 may enable the ability for the user to view and/or change heating and cooling setting in different zones at the user computing system 430. Similarly, if the device identifier field 1211 specifies a device variant that supports 7 day programming, then the user application 431 may present the user with the option to view and/or change the programmed temperature settings on each of the seven days of the week (Sunday through Saturday). However, if the device identifier field 1211 specifies a device variant that supports only weekday and weekend programming, then the user application 431 may instead only present the user with the option to view and/or change only two sets of programmed temperature settings—one for the weekday settings and the other for the weekend settings.

Including and using the device identifier field 1211 may, in some instances, result in lower user application development costs, since a single application may be used with a variety of devices 410. It may also eliminate confusion and errors at the user end. Without the device identifier field 1121, a user seeking to interact with a device 410 through the user computing system 430 may have to download and/or install the user application 431 corresponding to the user's particular device 410. This means that the user would have to select the particular user application 431 corresponding to the particular model and/or version of the user's device 410. If a manufacturer offers several different versions of the same device 410, such as different thermostat models, an unsophisticated user may get confused and install the wrong application.

With the device identifier field 1211, the manufacturer may be able to offer a single user application 431 for multiple device models and versions. Thus, a user may download a single user application 431, and the user application 431 may automatically present the user with the appropriate functions and features supported by the user's device 410 using the device information in the device identifier field 1121. This may eliminate one extra source of confusion and user error since the task of identifying the proper device make has been transferred from the user to the user application 431.

In some instances, the device 410 or other materials supplied with the device 410 may include a bar code, tag, alpha-numeric code, or other identifier that may be used by the user computing system to identify a corresponding user application 431 compatible with device 430 and/or identify the device 410 to the user application 431. In some instances, the identifier may be scanned or otherwise inputted into the user computing system 430. The user computing system 430 may use the identifier information to automatically download and/or install the appropriate user application 431 from the Internet or other source. In some instances the user computing system 430 may use the identifier information to configure the user application 431 or establish connectivity with the device 410.

In some embodiments, the memory 1210 of the device 410 may also include one or more user computing system fields 1215. These fields 1215 may store user system ID 1216 information about one or more interfaces, users, and/or user computing systems 430 that have communicated or are communicating with the device 410. The user computing system fields 1215 may also store information about whether a user computing system 430 is in communications range 1217 of the device (assuming wireless connectivity between the device 410 and the user computing system 430) or is communicatively coupled to the device (assuming physical connectivity between the device 410 and the user computing system 430). The user computing system fields 1215 may also store information about whether the user computing system 430, a device interface, or other apparatus is currently engaged in communications 1218 with the device 410.

The user system ID field 1216 may identify a particular user computing system 430 and/or user of a user computing system 430 that has communicated or is communicating with the device 410 through a user application 431. The data in the user system ID field 1216 may be obtained from identification information 1231 in the user computing system 430. This identification information 1231 may include an identifier of a user, such as a user ID of a user of the user computing system 430, or an identifier of the user computing system 430, such as, for example, a Media Access Control (MAC) address, a serial number, a Device Class, or a Device ID Profile (DIP), of the user computing system 430.

User system ID field 1216 data may be used by the device 410 to identify one or more users or user computing systems 430 authorized to communicate with the device 410. This may prevent others within connectivity range of the device 410 from installing and using a publicly available user application 431 on their own computing system to tamper with device settings.

The user system ID field 1216 data may also be used to store device settings associated with a particular user or user computing system 430. For example, in the case of a lighting control system, different users may be able to customize different lighting scenes. One user may prefer to have all the lights turn on at maximum brightness while another may prefer dimly lit rooms and brightly lit hallways and a third may prefer brightly lit rooms and dimly lit hallways. User system ID fields 1216 may be used to store each users preferred settings. In some instances the preferred settings may be stored in the device memory 1210 user ID or user computing system 430.

Storing preferred settings in the device memory 1210 by user ID may enable the same user to recall the user's preferred settings irrespective of the actual means by which the user attempts to change device settings. In other words, storing a user's preferred settings in the device memory 1210 by user ID may allow the user to subsequently recall the user's preferred settings irrespective of which user computing system 430 or device 410 is being used by the user.

Storing preferred settings in the device memory 1210 by user computing system ID may enable different users, each using their own separate user computing system 430, to recall their preferred settings either through their user computing system's 430 user application 431, or through a built-in interface of the device 410. Thus, storing a user's preferred settings in the device memory 1210 by user computing system ID may allow different users to subsequently recall their preferred settings when they use a device's 410 built-in interface or other apparatus to change system settings instead of their own user computing system 430.

The system in range field 1217 may be used to indicate whether a user computing system 430 is connected to or within connectivity range of the device 410. In some instances a user computing system 430 may be classified as connected to or within connectivity range of the device 410 when the device transceiver 1114 is able to establish connectivity with the user computing system transceiver 1135. In other instances, different criterion may be used to determine the connectivity between the user computing system 430 and the device 410.

The system in range data 1217 may be used by the device to automatically change system settings in some embodiments. If, for example, the device 410 is a lighting control system and the user computing system 430 is a cell phone or other portable device that may be carried by a user, the lighting control system may use the system in range data 1217 to automatically raise or turn on the lighting when the user computing system 430 is detected as within in range and automatically dim or turn off the lighting when the user computing system 430 is detected to be out of range.

Positioning technology, such as global positioning system (GPS) technology, cellular or wireless signal triangulation technology, and other positioning technology may also be used as part of system in range data 1217 to automatically change device settings based on a location change of the user computing system 430. For example, in the case of the lighting control system, the lighting in a building or area may be automatically adjusted as the user computing system 430 is carried from location to location to conserve energy.

In some embodiments, the system in range 1217 data may also be used in conjunction with the user system ID 1216 data to implement a device setting change associated with the user system ID 1216 data. In these embodiments, when a change in system in range 1216 data triggers a device setting change, the device 410 may retrieve and implement settings change data associated with the user system ID 1216 of the user computing system 430 causing the change in system in range 1216 data.

For example, in the case of the lighting control system, if user X carrying user computing system 430-X arrives at a location and user computing system 430-X is detected as being in range 1217 of the device 410, the lighting control system may turn on all the lights to maximum brightness based on the preferred settings associated with device 430-X. However, if instead if user Y carrying user computing system 430-Y arrives at the same location and user computing system 430-Y is detected as being in range 1217 of the device 410, the lighting control system may only turn on half the lights to half the maximum brightness.

The system communicating field 1218 may be used to store data indicating whether a user computing system 430, interface of the device 410, or other apparatus is currently engaged in communications with the device 410. The system communicating field 1218 may be used by the device 410 to prevent conflicts between the different means for changing device settings. The system communicating field 1218 may therefore be used to preserve atomicity, consistency, isolation, and durability of the data and transactions processed by the device 410.

For example, in the case of a programmable thermostat, if both a first person using a user application 431 on a user computing system 430 and a second person using an interface provided on the device 410 itself attempt to simultaneously reprogram the thermostat to different temperatures on different days, an error may occur or at least one person's changes may not be fully implemented. To prevent this, the system communicating field 1218 may indicate if a user computing system 430 or interface of a device 410 is currently engaged in communications with the device 410. The data in the system communication field 1218 may be used by the device 410 to lock device settings and prevent simultaneous attempts to access and/or change device settings.

In some instances, the device 410 may restrict read, write, or both read/write access to only one access means at a time. Thus, if, in the thermostat example, a person is attempting to reprogram the thermostat using the interface on the thermostat itself, another person using the user application 431 on a user computing system 430 may be preventing from reprogramming the thermostat through the user application 431 during this period. Similarly, if a person is attempting to reprogram the thermostat through the user application 431 on the user computing system 430, others may be prevented from reprogramming the thermostat using the interface on the device 410 or through other user computing systems, though in some embodiments, other user may still be able to read but not change the programmed temperatures.

In some instances a timeout feature may also be provided so that if the device interface, user application, and/or device settings are not accessed or changed within a predetermined time, the system communicating field 1218 data may be changed to indicate that the user computing system 430 or interface of a device 410 is no longer engaged in communications with the device 410.

In some embodiments, devices 410 may be designed to communicate with other devices and/or a control system, such as a network coordinator. Each of these devices 410 may include hardware, drivers, protocols, and/or other tools enabling the devices to transmit and receive data through wireless or wired connectivity with the other devices and/or the control system. For example, devices such as light switches, timers, appliances, electric meters, security systems, and electronics may be fitted with digital radios and other technology to enable the devices to communicate with each other and/or a control system. The hardware, drivers, protocols, and other tools used by these devices 410 to communicate amongst each other and/or the device control system may be incompatible with the connectivity options included in the user computing system 430 executing the user application 431.

Figure 13:
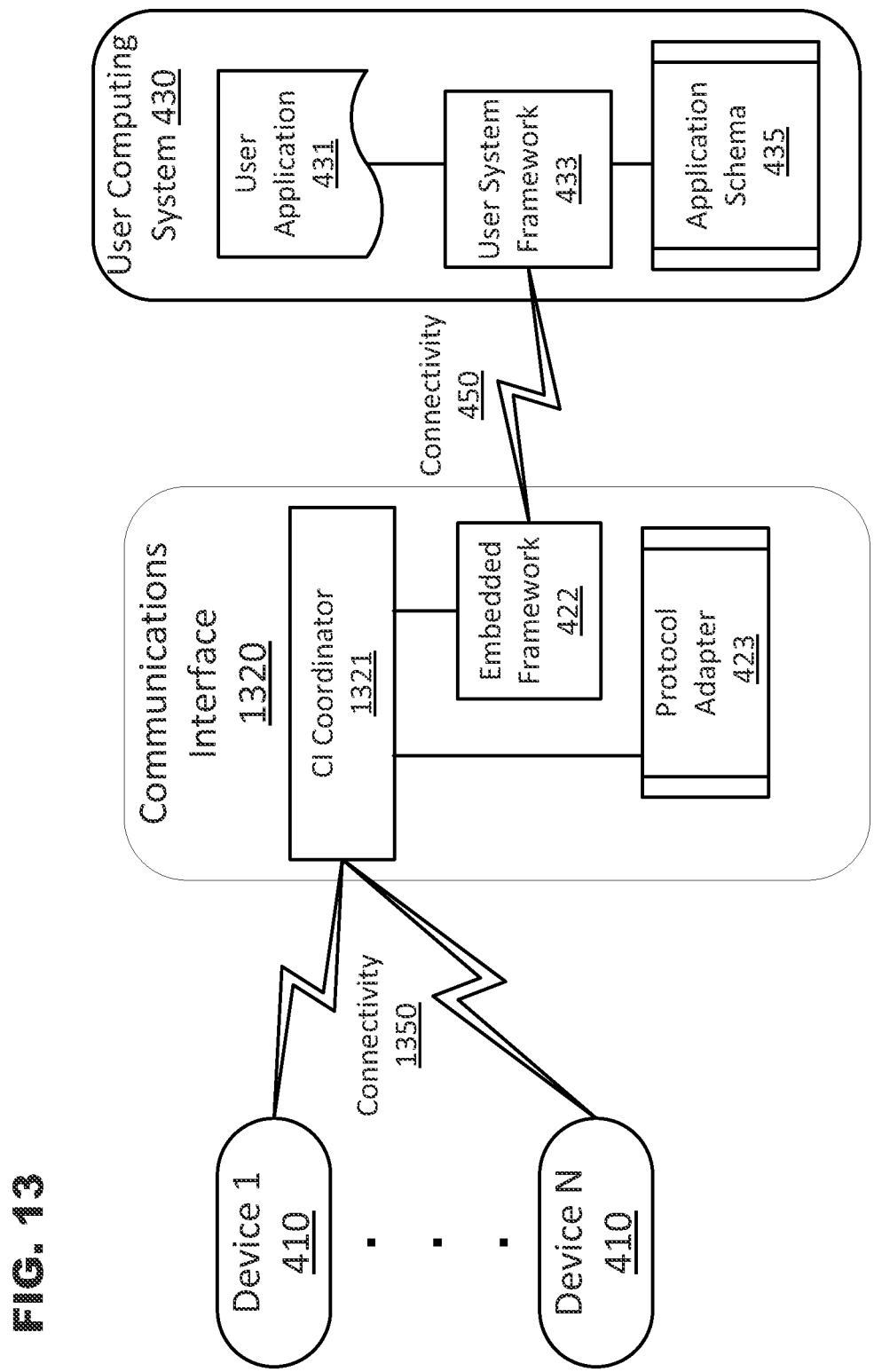
FIG. 13 shows a first embodiment in which a communications interface may be used to enable an exchange of data.

FIG. 13 shows an embodiment in which a communications interface 1320 may be used to enable an exchange of data between the user application 431 in the user computing system 430 and the devices 410 and/or the device control system having connectivity options incompatible with the user computing system 430.

The communications interface 1320 may include a communications interface coordinator module 1321, a protocol adapter 423, and an embedded framework 422. The protocol adapter 423, embedded framework 422, user system framework 433, and application schema 435 may have the same functionality previously discussed. For example, the embedded framework 422 and the user framework 433 may instantiate a connection independent communications protocol used to transmit data between the user computing system 430 and the communications interface 1320 through a mutually supported connectivity standard.

The protocol adapter 423 in communications interface 1320 and the application schema 435 in the user computing system 430 may specify the syntax and/or semantics of this communications protocol. The embedded framework 422 may encode data received from the communications interface coordinator 1321 to be sent to the user computing system 430 and decode data received from the user computing system 430 to be sent to one or more devices 1 to N 410 according to the syntax and semantics specified in the protocol adapter 423. Similarly, the user framework 433 may encode data received from the user application 431 to be sent to the communications interface 1320 and decode data received from the embedded framework 422 to be sent to the user application 431 according to the syntax and semantics specified in the application schema 435.

The communications interface coordinator 1321 may interface with the embedded framework 422 and a protocol adapter 423 to communicate with its counterpart user framework 433 in the user computing system 430 using a first connectivity standard 450 supported by both the user computing system 430 and the communications interface 1320. The communications interface coordinator 1321 may also interface with one or more devices 1 to N 410 using a second connectivity standard 1350 supported by the devices 410. The communications interface coordinator 1321 may include tools, such as drivers, protocols, syntax information, and semantic information used by the second connectivity standard 1350 in order to properly encode/transmit data to the devices 410 and decode/receive data from the devices 410 using the second connectivity standard 1350.

In some instances the connectivity 450 between the communications interface 1320 and the user computing system 430 may be established using separate hardware from the connectivity 1350 between the communications interface 1320 and the devices 410 or device control system. This separate hardware may include separate transmitters, encoders, decoders, receivers, and/or other components. In some other instances the same hardware may be used to establish connectivity 1350 and 450 with both the devices 410 and the user computing system 430.

The communications interface 1320 may be included in a housing separate from the devices 410 and the user computing system 430. In some instances, the communications interface 1320 may be housed in a portable dongle, adapter, or stand alone housing that may be attached to user computer system 430, a device 410, or a device control system, to provide the additional connectivity between the devices 410, device control system, and/or the user computing system 430 executing the user application 431.

The communication interface 1320 may provide multiple connectivity options. For example, in some instances, the communications interface 1320 housing may include at least one USB®, Thunderbolt®, Ethernet, and/or other wired ports to enable wired connectivity 450 between the communication interface 1320 and the user computing system 430. The communications interface 1320 may, in some instances, include at least one WiFi®, infrared, Bluetooth®, Bluetooth Low Energy®, and/or other wireless ports to enable wireless connectivity 1350 between the communications interface 1320 and the device control system and/or the devices 410.

The wired ports may enable wired connectivity 1350 between the communications interface 1320, the control system, and/or the devices 410. This wired connectivity 1350 may be offered instead of or in addition to wired connectivity 450. The wireless ports may enable wireless connectivity 450 between the communications interface 1320 and the user computing system 430. This wireless connectivity 450 may be offered instead of or in addition to wireless connectivity 1350.

Figure 14:
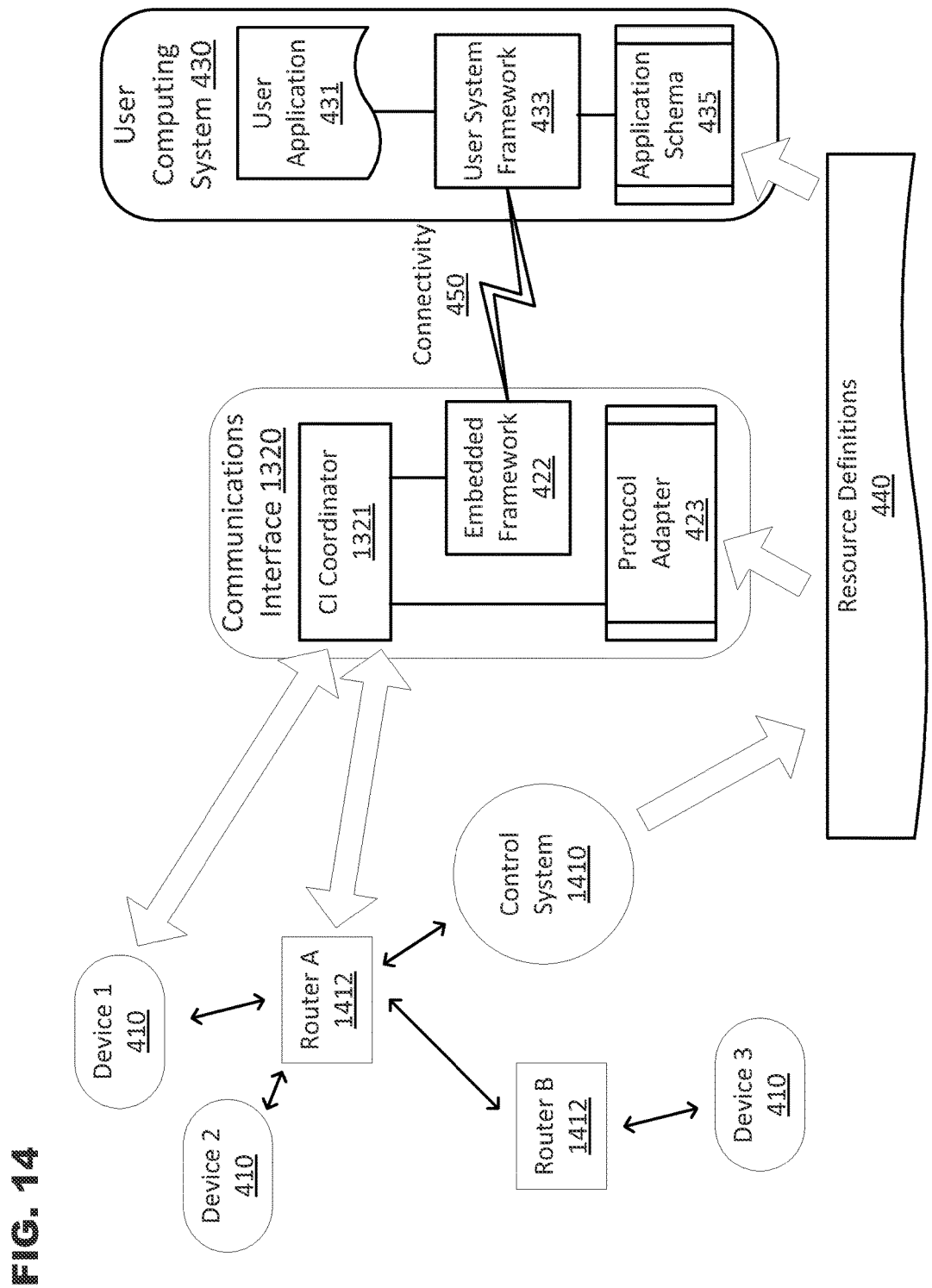
FIG. 14 shows a second embodiment in which a communications interface may be used to enable an exchange of data.

FIG. 14 shows an embodiment in which a communications interface 1320 may be used to enable an exchange of data between the user application 431 in the user computing system 430 and one or more devices 410 having connectivity options incompatible with the user computing system 430. In this embodiments, devices 1 and 2 410 may register and communicate with a control system 1410 through router A 1412. Device 3 410 may register and communicate with the control system 1410 through router B 1412 which may be communicatively coupled to router A 1412, which may in turn be communicatively coupled to the control system 1410. The control system 1410 may act as a network coordinator, may register devices 410, and/or manage interactivity between the devices 410. The network coordinator may setup the network, may register and/or be aware of the devices connected to the network, manage the information about each device connected to the network, and/or manage information being transmitted or received within the network.

Information about each of the devices 410 that have registered with the control system 1410 or which the control system 1410 is aware of may be downloaded or otherwise included as part of the resource definitions 440. The information that may be included as part of the resources definitions 440 may include a device identifier to enable the communications interface coordinator 1321 to communicate with the device 410 or a device property to identify data that may be written to or read from the device 410. The device identifier may be a code, frequency, key, or other identifier. In some instances, the information obtained from the control system 1410 may be modified into a format recognized by a complier or other tool transforming one or more selected resource definitions 440 into adapters and schema, such as protocol adapter 423 and/or application schema 435, before being included in the resources definitions 440.

In some instances, a list of possible devices may be presented for selection. The selection of a device 410 from the list may be used to ensure that only information of the selected device 410 is included in the resource definitions 440. The list of devices may include a list of device types obtained from the control system 1410 or another source. The list of device types may include a device type identifier that may enable the communications interface coordinator 1321 to communicate with devices of a particular type.

Once the desired device information, which may include device type information, has been included in the resource definitions 440, the information may be used in both the protocol adapter 423 and the application schema 435 to enable a user to interact with the device through the user application 431. For example, the user application 431 may provide tools for interacting with the selected devices or device types based on the device information included in the application schema 435. Similarly, the communications interface coordinator 1321 may be configured to communicate directly with the selected devices and/or device types using the device information included in the protocol adapter 423.

In an embodiment, the communications interface coordinator 1321 may communicate with a selected device 410 or device type using the identifier information included in the resource definitions. In some instances, the communications interface 1320 may communicate directly with the selected devices or device types by establishing a direct connection with each device or device type through the coordinator 1321. In other instances, the communications interface 1320 may broadcast a message addressed to a device or device type over a network. In some instances, the communications interface 1320 may first connect to a network used by a selected device or device type and then send a message addressed to the selected device or device type using that network.

In some situations, the operational status of different devices 410 may change. For example, devices 410 may be added, removed, activated, deactivated, or otherwise connected or disconnected. In the example shown in FIG. 14, the communications interface coordinator 1321, the user application 431, and/or the other shown components may be configured to check the operational status of one or more devices 410 before the user is presented with the opportunity to interact with the particular device 410 through the user application 431. The user application 431 may be configured to bypass these opportunities if the particular devices 410 are not operational or the communications interface 1320 is not able establish connectivity with the particular device 410.

The communications interface 1320, user application 431, or other shown components may include a timeout option causing the user application 431 to abort a requested interactivity with a particular device 410 if connectivity with the particular device 410 is not established within a predetermined time.

In some instances the communication interface coordinator 1321, protocol adapter 423, and/or resource definitions 440 may be updated with new device information before the communications interface 1320 may establish connectivity with a newly added device or device type.

In those instances where a particular device type is selected, the communications interface 1320 may interact with each of the active devices associated with the selected device type. For example, if ceiling lights are selected as a device type, then the communications interface 1320 may interact with each of the then active lights classified as ceiling lights. However, if instead a particular device is selected, such a left wall spotlight, then the communications interface 1320 may interact with that particular device if it is active.

Figure 15:
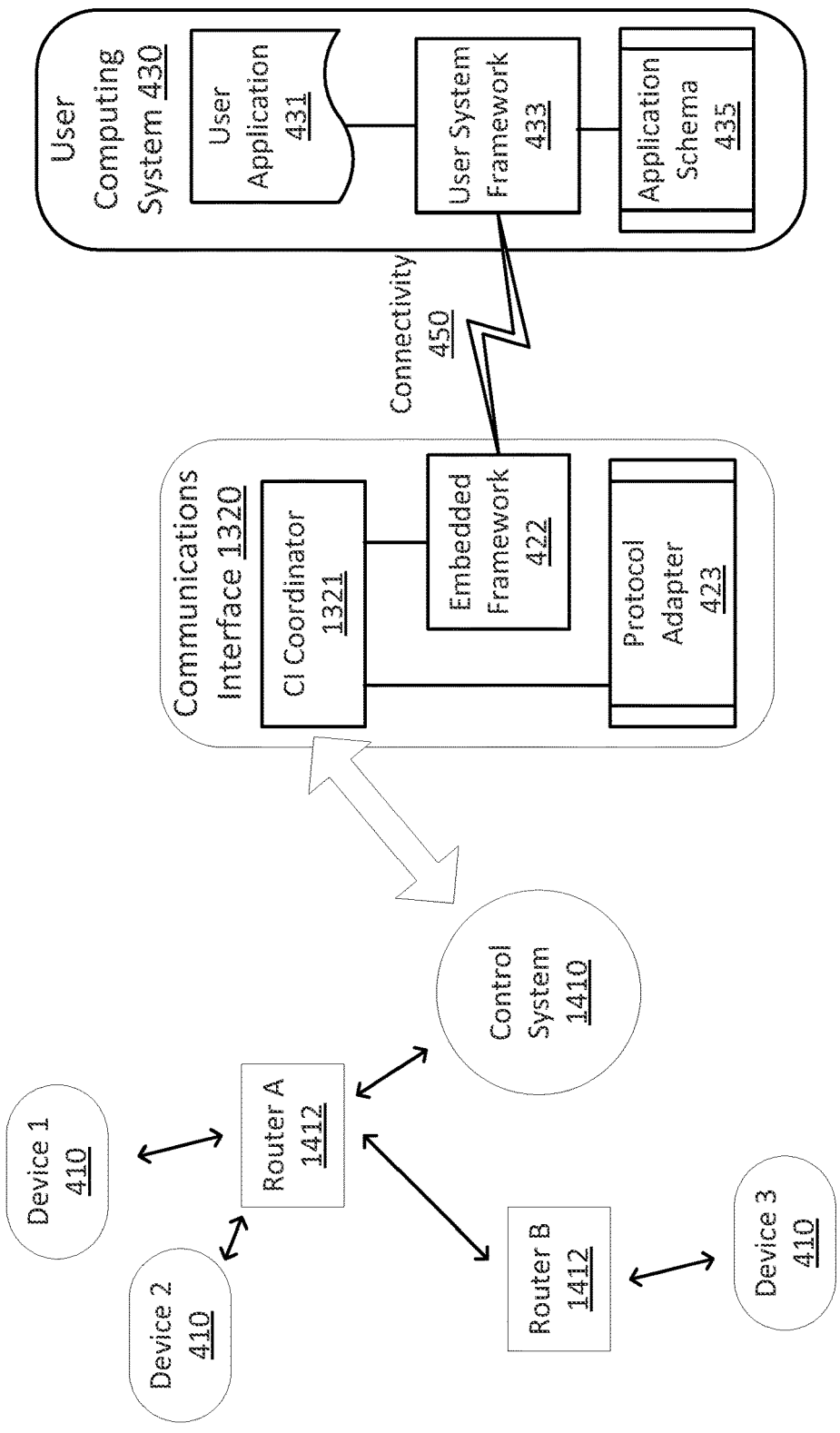
FIG. 15 shows a third embodiment in which a communications interface may be used to enable an exchange of data.

FIG. 15 shows an embodiment in which a communications interface 1320 may be used to enable an exchange of data between the user application 431 in the user computing system 430 and one or more devices 410 through a control system 1410 communicatively coupled to the communications interface 1320. The devices 410 and/or the control system 1410 may have connectivity options incompatible with the user computing system 430.

In this example, the control system 1410 may be used as a network coordinator, to register new devices, and/or to facilitate inter-device communications. When a new device 410 is first registered at the control system 1410, the device information, such as a device identifier and a device property may be relayed through the communications interface to the user computing system 430. The device may then be presented to the user through the user application 431, where the user may be able to view, set, or change a device setting.

In some instances, the communications interface coordinator 1321 may be preconfigured with the protocols, tools, and functionality needed to receive device information from the control system 1410 and send the device information to the user computing system 430 through the embedded framework 422. Similarly, the communications interface coordinator 1321 may be preconfigured to receive device instructions from the user computing system 430 through the embedded framework 422 and send those device instructions to the control system 1410 in a format and structure recognized by the control system 1410. In this regard, the communications interface 1320 may act as a conduit of device information and instructions between the control system 1410 and the user computing system 430.

In other instances, the communications interface coordinator 1321 may be configured with different protocols, tools, and functionality needed to exchange device information and instructions between different types of control systems 1410 and the communications interface 1320. In this situation, a model number, serial number, or other identifier of a control system 1410 may be specified in the resource definitions 440 so that the communications interface coordinator 1321 may be configured with the proper set of protocols, tools, and functionality for communicating with a particular control system type 1410.

Device information from the control system 1410 may be sent asynchronously or synchronously to the communications interface 1320 and/or the user computing system 430. In some instances, the device information exchanged between the control system 1410 and these other systems 430 and 1320 may be limited to certain types of device or devices having certain other predetermined criteria. In some instances, the control system 1410 may transmit updated device information, such as whether a new device has registered, or an existing device has recently changed status, when such updates occur, but in other embodiments, the updates may be transmitted periodically or even only when requested by the user application.

In an embodiment the user application 431 may include customizable fields or tables that may store device information received from the control system as well as any changes or updates. These customizable fields and tables may be used by the user application 431 to identify those currently active devices that the user is able to interact with through the user application. In an embodiment, any changes or modifications to device settings performed through the user application may be relayed to the communications interface 1320 through connectivity 450 and then to the control system 1410 through the connectivity between the control system 1410 and the communications interface coordinator 1321. The control system 1410 may then relay the settings change to the device 410.

Figure 16:
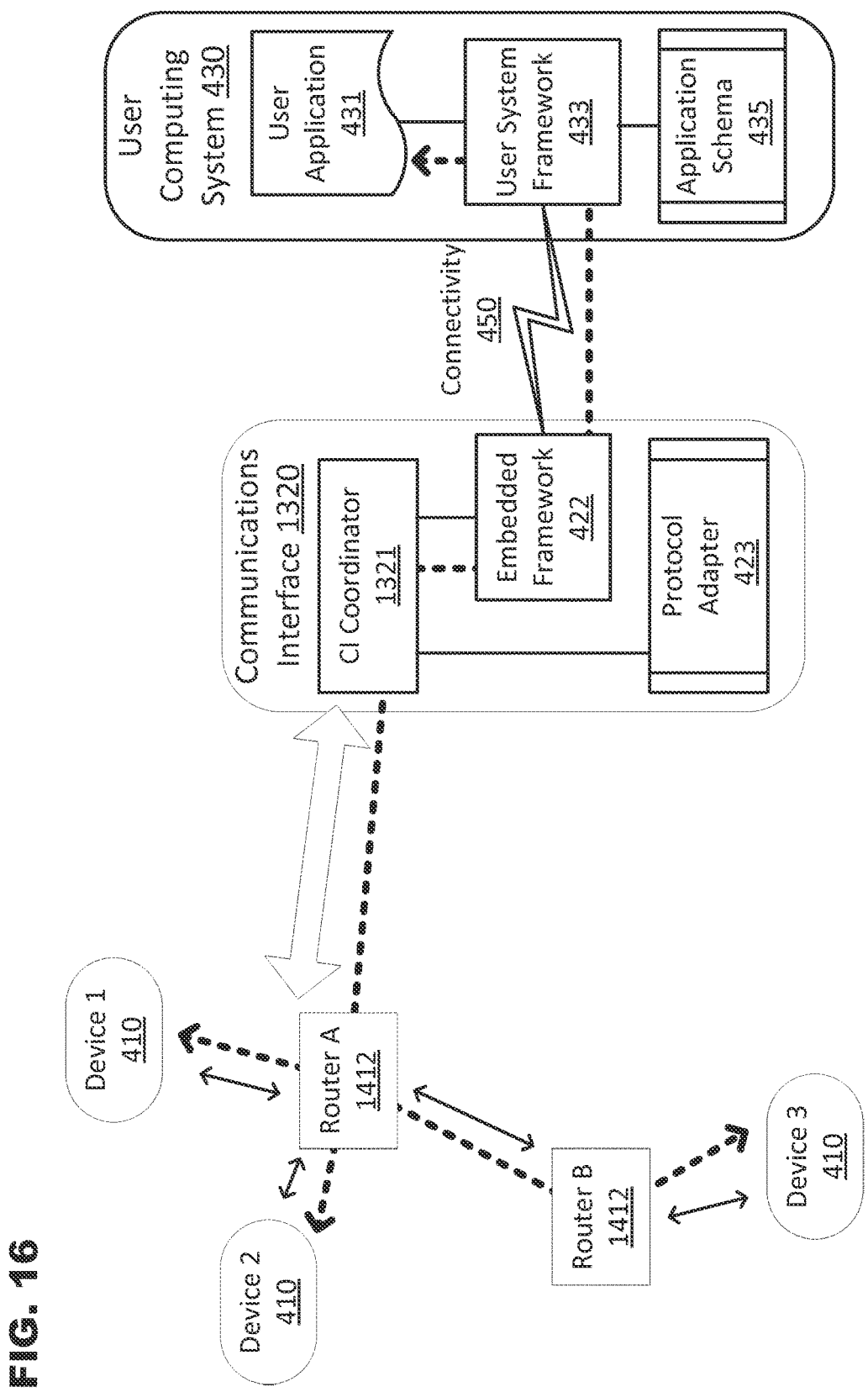
FIG. 16 shows a fourth embodiment in which a communications interface may be used to enable an exchange of data.

FIG. 16 shows an embodiment in which a communications interface 1320 may be used to enable an exchange of data between the user application 431 in the user computing system 430 and one or more devices 410 through the communications interface coordinator 1321 if the devices 410 have connectivity options incompatible with the user computing system 430. In this example, the communications interface coordinator 1321 may directly communicate with each device 410. One or more routers 1412 or other packet switching devices may be used to route packets destined for each a particular device 410 or the communications interface coordinator 1321.

The coordinator 1321 may send beacons or polling messages to determine if there are any devices 410 seeking to communicate with the coordinator 1321 or the user computing system 430. Alternatively, the coordinator 1321 may wait until it receives a communication from a device 410 to determine if there are any devices seeking to communicate with the coordinator 1321 or the user computing system 430. The coordinator 1321 may maintain a list of those devices 410 authorized to communicate with the user application through connectivity 450 and/or user framework 433 and/or embedded framework 422. The coordinator 1321 may also maintain device status information. The device status information may be displayed in the user application 431 or otherwise used to update the user application 431, such as by removing devices 410 that are listed as having an inactive status and adding devices 410 listed as having an active status.

The communications interface coordinator 1321 may be preconfigured with the protocols, tools, and functionality needed to communicate with each of the devices 410, such as sending settings changes to the devices 410 and receiving device information from the devices 410. The coordinator 1321 may also include protocols, tools, and functionality to restructure device settings information sent to and received from the devices 410 into a format compatible with the embedded framework 422 and user system framework 433 recognized by the user application 431 and user computing system 430. In this regard, the communications interface 1320 may act as a conduit of device information and instructions between the control system 1410 and the user computing system 430.

The communications interface coordinator 1321 may also support multiple protocols, tools, and functionality needed to exchange device information and instructions between different configurations and types of devices 1410 and the communications interface 1320. In this situation, a model number, serial number, or other identifier of a device configuration or type may be specified in a configuration transmission sent from device 410 to the communications interface 1320. The device type or configuration identifier may be used by coordinator 1321 to select the proper set of protocols, tools, and functionality to enable the coordinator 1321 to correctly encode and decode device information in messages sent to the respective device 410. Device information may be sent asynchronously or synchronously to the coordinator 1321 and/or user computing system 430. In some instances, the device information exchanged between these devices 410, the coordinator 1321, and/or the user computing system 430 may be limited to certain types of device or devices having certain other predetermined criteria.

In an embodiment the user application 431 may include customizable fields or tables that may store device information received from the control system as well as any changes or updates. These customizable fields and tables may be used by the user application 431 to identify those currently active devices that the user is able to interact with through the user application. In an embodiment, any changes or modifications to device settings performed through the user application may be relayed to the communications interface 1320 through connectivity 450 and then to the respective devices 410 through the connectivity between the devices 410 and the communications interface coordinator 1321.

FIG. 17 shows exemplary definitions of time, date, temperature, and scheduling settings that may be stored in a memory of a programmable thermostat in a second programming language 1700 that is different from that shown in FIG. 2. In this embodiment, the currentTime resource 1701, may be created and defined as having a structured type 1702 with an hour component that ranges from 0 to 23 (shown as num <0,23>) and a minute component that ranges from 0 to 59 (shown as num <0,59>).

A currentDay resource 1703 may be created and defined as having an enumerated type 1704 with the data stored in the currentDay field limited to and corresponding to one of the seven days of the week, which are expressly listed 1704.

A currentTempInF resource 1705 may be created and defined as having a numeric value type 1706 (shown as num <20, 105, 1>) with the data stored in the currentTempInF field limited to a minimum value of 20, a maximum value of 105, and any intermediary values that are incremental units of 1 above 20 and below 105, such as 21, 22, 23, and so on.

A schedule resource 1707 may be created based on an existing configuration of the thermostat. Thus, if the programmable thermostat is configured to allow a user to change a temperature four times each day, once at preset time e.g. when the user wakes up, once at a preset time e.g. when the user leaves for work, once at a preset time e.g. when the user returns home from work, and once e.g. when the user goes to sleep, then the schedule resource 1707 may be defined accordingly. For example, the schedule resource may include a structured type 1709 having four fields, including a wake field, a leave field, a back field, and a sleep field.

Each of the four fields 1709 may include a structure type 1708 having a start time component and a temperature component specifying the temperature to take effect at the start time. The start time component may be in the format of structured type 1702 with an hour component that ranges from 0 to 23 (shown as num <0,23>) and a minute component that ranges from 0 to 59 (shown as num <0,59>). The temperature component may be in the format of a numeric value type 1706 with the data being limited to a minimum value of 20, a maximum value of 105, and any intermediary values that are incremental multiples of 1 above 20 and below 105, such as 21, 22, 23, and so on.

FIG. 18 shows exemplary code 1800 defining resources 440 associated with a blinking device capable of flashing a light on and off at different rates in a second programming language format that is different from that shown in FIG. 6. In the example shown in FIG. 6, definitions are shown for a write only input field "cmd" 1801 to start or stop the blinking device, an integer read-write counter field 1802, a numeric read-write delay field 1803 controlling the flashing of the light in 0.1 unit increments between 0.5 and 2.0, and a read only LED state output field 1804 indicating whether the light is on or off.

FIG. 19 shows exemplary application schema code 1900 generated in a different programming language from that shown in FIG. 7. The application schema code 1900 in FIG. 19 may be generated from the defined resource code 1800 shown in FIG. 18. The application schema code 1900 may identify each of the resources 1901, properties 1902 of each resource, and acceptable values 1903 associated with each resource. An application developer may then use this information to create a user application 431. The user application 431, the application schema 435, and a mobile framework may be installed on the user computing system 430.

FIG. 20 shows exemplary prototype declarations 2001 for reading data from and writing data to virtual data objects of the electronic device that are generated from the resource definition code shown in FIG. 18. Each of the resources may have a corresponding fetch and/or store prototype declaration generated depending on whether data corresponding to the resource is able to be read from the device, in which case a fetch function is provided, or written to the device, in which case a store function is provided. For example, a Blinker_cmd_store function may be provided for resource cmd 2002 which is classified as write only in the resource definition code shown in FIG. 18. Both fetch and store functions may be provided for resources count 2003 and delay 2004, which are classified as readable and writeable. A fetch function and not a store function may be provided for resource ledState 2005, since it is classified as a read only.

FIG. 21 shows exemplary embedded adapter code 2100 including code stub insertion placeholders 2101 generated from the resource defining code 1800 shown in FIG. 18. Each of the fetch and store functions may be provided with separate code stub insertion placeholders 2101. Code developed by a programmer or engineer familiar the device's structure may be inserted in each of the placeholders. This code may provide instructions for reading/fetching data from or writing/storing data to corresponding values, variables, functions, data structures, or other entities of the device associated with each of the specified resources (such as the resources cmd 1801, count 1802, delay 1803, and ledState 1804). Once the code is inserted, the completed embedded adapter code may be then be uploaded, installed, embedded, or otherwise supplied to the device.

FIG. 22 shows exemplary protocol adapter code 2200 in a different programming language from that shown in FIG. 8. The exemplary protocol adapter code 2200 in FIG. 22 may be generated from the defined resource code 1800 shown in FIG. 18. The exemplary code 2200 in FIG. 22 includes a fetch function 2201 to retrieve data from a device 410 and a store function 2202 to send data to the device 410.

The protocol adapter code 2200 in FIG. 20, for example, also provides for two parameters, an id parameter 2203 and a data parameter 2204, for the fetch 2201 and store 2202 functions. These functions and parameters may define, for example, some of syntax and semantics of this communications protocol. The id parameter 2203 may be a numeric identifier corresponding to a defined resource (i.e. 1 represents the cmd resource 1801, 2 represents the count field 1802, 3 represents the delay field 1803, and 4 represents the field 1804 identifying whether the light is on or off), and the data parameter 2204 may include a data value associated with the defined resource specified in the id parameter. The data parameter 2204 may be similar to the buf parameter in FIG. 8.

The protocol adapter code 2200 may be used by the embedded framework 422 to encode data received from the device 410 and transmit the encoded data to the user system framework 433 and to decode data received from the user system framework 433 and transmit the decoded data to the device 410.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, in some embodiments the resource definitions may be used to generate separate protocol adapters and embedded adapters. In other embodiments, the resource definitions may be used to generate one of the adapters or a consolidated adapter that may be used in lieu of the separate adapters.

We claim:

1. A computer-implemented method comprising:
   receiving, at a processing device, resource defining code including one or more resource definitions for one or more resources;
   associating, as part of a connection independent protocol, the one or more resources with one or more parameters transmitted according to the connection independent protocol between an electronic device and a user computing system, wherein the one or more resources represent one or more virtual data objects of the electronic device;
   generating, using the processing device, embedded adapter code mapping the one or more resources to one or more memory segments in the electronic device containing the one or more virtual data objects, wherein generating the embedded adapter code includes processing the resource defining code including the one or more resource definitions and creating one or more code placeholders for each resource definition where additional code mapping the resource to the memory segment in the electronic device is configured to be inserted, and wherein the embedded adapter code is embedded in the electronic device; and
   implementing the connection independent protocol using the processing device, wherein the transmission of the parameter and a value associated with the parameter according to the connection independent protocol enables a transfer of data between the virtual data object of the electronic device and an application of the user computing system providing an interface for an interaction with the virtual data object.

2. The computer-implemented method of claim 1, wherein the connection independent protocol is implemented at the electronic device.

3. The computer-implemented method of claim 1, wherein the connection independent protocol is implemented at the user computing system and the user computing system is one of a mobile phone, a tablet, and a portable computing device.

4. The computer-implemented method of claim 1, wherein the connection independent protocol is implemented at both the user computer system and the electronic device.

5. The computer-implemented method of claim 1, wherein the virtual data object is a content of a memory register in the electronic device.

6. The computer-implemented method of claim 1, wherein the virtual data object is a content of an input or an output of the electronic device.

7. The computer-implemented method of claim 1, wherein the virtual data object is a result of a manipulation of data at the electronic device.

8. The computer-implemented method of claim 1, wherein the parameter is an identifier of the resource in the electronic device and the connection independent protocol includes a buffer to transmit the value associated with the parameter according to the connection independent protocol.

9. The computer-implemented method of claim 1, further comprising:
   identifying a plurality of resources representing a plurality of virtual data objects of the electronic device; and
   associating each identified resource with unique parameters, wherein the transmission of at least one of the unique parameters and a value associated with the at least one of the unique parameters according to the connection independent protocol enables the transfer of data between at least one of the virtual data objects of the electronic device and the application of the user computing system.

10. The computer-implemented method of claim 1, further comprising:
    displaying a simulated interface of the application of the user computing system;
    retrieving data from the mapped memory segment according to the mapping in the additional code in response to a simulated request to read data from the mapped memory segment; and
    displaying the retrieved data in the simulated interface.

11. The computer-implemented method of claim 10, further comprising:
    formatting the retrieved data according to a format specified in the resource representing the virtual data object; and
    displaying the formatted data in the simulated interface.

12. The computer-implemented method of claim 1, further comprising generating protocol adapter code from the resource, the protocol adapter code identifying syntax and semantics of the implemented connection independent protocol obtained from the resource, wherein the protocol adapter code is executed at the electronic device to implement the connection independent protocol at the electronic device.

13. The computer-implemented method of claim 12, wherein the protocol adapter code includes: a fetch function capable of retrieving data from the electronic device, a store function capable of sending data to the electronic device, a first parameter identifying a resource, and a second parameter identifying a value associated with the resource in the first parameter, wherein the first and second parameters are included as part of the fetch and store functions.

14. The computer-implemented method of claim 12, wherein the protocol adapter code is used to encode data received from the electronic device and transmit the encoded data to the user computing system and decode data received from the user computing system and transmit the decoded data to the device.

15. The computer-implemented method of claim 12, wherein the protocol adapter code and the embedded adapter code are included in a single consolidated adapter.

16. The computer-implemented method of claim 1, further comprising:
    reading the memory segment in the electronic device containing the virtual data object;

assigning the parameter associated with the resource representing the virtual data object to the data read from the memory segment; and transmitting the assigned parameter and the data read from the memory segment according to the connection independent protocol to the application of the user computing system.

17. The computer-implemented method of claim 1, further comprising:

receiving at an embedded adapter the parameter and the value associated with the parameter, wherein the parameter and the value associated with the parameter are received from the application of the user computing system;

identifying the virtual data object from the received parameter; and sending the received value to the memory segment in the electronic device through the mapping in the inserted additional code.

18. The computer-implemented method of claim 1, further comprising:

identifying a data type, a behavior, and a range of valid values of the virtual data object from the resource; and generating, using the processing device, an application schema including the identified data type, the identified behavior, the identified range of valid values, the association of the resource with the parameter transmitted according to the connection independent protocol, and a syntax and a semantic of the connection independent protocol.

19. The computer-implemented method of claim 18, further comprising:

importing the application schema into an application development program; and creating the application in the application development program from the imported application schema, the application instantiating an interface for a user interaction with the virtual data object.

20. The computer-implemented method of claim 19, further comprising:

generating a plurality of application schema from a plurality of resources representing a plurality of virtual data objects of a plurality of electronic devices;

importing the plurality of application schema into the application development program; and creating a single application from the imported application schema, wherein the single application enables access to the plurality of virtual data objects in the plurality of electronic devices, wherein at least two of the electronic devices do not interact with each other.

21. The computer-implemented method of claim 19, further comprising:

identifying a default value of the virtual data object included in the resource;

including the default value in the application; and displaying the default value in the application during a simulation of communications between the application and the virtual data object of the electronic device.

22. The computer-implemented method of claim 19, wherein the created application is configured to simulate the communications between the application and the virtual data object of the device and enable a user to access the functionality of the application without transferring data between the virtual data object of the electronic device and an application of the user computing system.

23. The computer-implemented method of claim 19, further comprising securing the created application, wherein the securing of the created application prevents tampering with the created application.

24. The computer-implemented method of claim 18, wherein the identified behavior indicates whether the resource is readable from and writeable to the electronic device.

25. The computer-implemented method of claim 18, further comprising generating documentation from the resource, the documentation including a summary of the resource, the data type, the behavior, and the range of valid values.

26. The computer-implemented method of claim 18, wherein the application schema is generated in a Standard Generalized Markup Language (SGML) or extensible Markup Language (XML).

27. The computer-implemented method of claim 18, wherein the range of valid values includes a starting value, an ending value, and increment for valid values between the starting value and the ending value.

28. The computer-implemented method of claim 1, further comprising executing a set of pre-generated instructions enabling communications with a processor included in the electronic device, the set of pre-generated instructions selected from a plurality of instructions based on an identifier included in the resource that identifies a type of processor included in the electronic device.

29. The computer-implemented method of claim 1, wherein the application includes a tracking function enabling a third party to track use of the application.

30. The computer-implemented method of claim 1, wherein the application includes a remote diagnostic feature capable of reporting an error or abnormal event at the electronic device to a third party.

31. The computer-implemented method of claim 1, wherein the application is downloaded from a remote computing system to the user computing system.

32. The computer-implemented method of claim 1, further comprising encrypting the data transferred between the electronic device and the user computing system.

33. The computer-implemented method of claim 1, further comprising:

inputting an identifier associated with the electronic device into the user computing system;

identifying an application compatible with the electronic device from a plurality of applications based on the identifier; and installing the identified application on the user computing system.

34. The computer-implemented method of claim 1, further comprising:

inputting an identifier associated with the electronic device into the user computing system;

identifying a configuration setting of an application compatible with the electronic device based on the identifier; and implementing the identified configuration setting in the application.

35. The computer-implemented method of claim 1, wherein the electronic device and the user computing system communicate wirelessly using a wireless connectivity and the connection independent protocol is implemented to enable the transfer of the data over the wireless connectivity.

36. The computer-implemented method of claim 1, further comprising:

transferring data from a device identifier field in a memory of the electronic device to the user computing system over the implemented connection independent protocol; and enabling capabilities in the application matching the capabilities of the electronic device based on the transferred data from the device identifier field.

37. The computer-implemented method of claim 1, wherein the electronic device includes data identifying at least one user or user computing system authorized to communicate with the electronic device and the electronic device only enables the transfer of data with an authorized user or user computing system.

38. The computer-implemented method of claim 1, further comprising:
   identifying a location of the user computing system in relation to the electronic device; and
   automatically changing a user-changeable setting in the electronic device when the user computing system is identified to be in a predetermined range of the electronic device.

39. The computer-implemented method of claim 1, wherein the electronic device stores a preferred setting of at least one user or user computing system that is recalled after the user computing system implements the connection independent protocol.

40. An electronic device comprising:
   a transmitter;
   a receiver;
   a processor including a virtual data object containing data relating to a functionality of the electronic device;
   an embedded adapter including a mapping of a plurality of virtual data objects in the device to a plurality of resources, wherein the embedded adapter includes embedded adapter code generated based upon, at least in part, resource defining code including one or more resource definitions for the plurality of resources received at and processed by the processor to create one or more code placeholders for each resource definition where additional code mapping the resource to the memory segment in the electronic device is configured to be inserted and wherein the embedded adapter code is embedded in the processor; and
   a protocol adapter implementing a protocol for transferring a parameter and a value associated with the parameter between the electronic device and a user computer system through the transmitter and the receiver and the protocol adapter including a mapping of each resource to a unique parameter in the protocol.

41. The electronic device of claim 40, wherein
   the receiver receives a read request specifying the parameter from the user computing system,
   the protocol adapter identifies the resource from its included mapping,
   the embedded adapter identifies the virtual data object from its mapping and reads the data from the virtual data object, and
   the transmitter transmits the parameter and the read data to the user computing system according to the protocol.

42. The electronic device of claim 40, wherein
   the receiver receives a write request specifying the parameter and the value associated with the parameter from the user computing system,
   the protocol adapter identifies the resource from its included mapping, and
   the embedded adapter identifies the virtual data object from its mapping and sends the value in the write request to the virtual data object.

43. The electronic device of claim 40, wherein the transmitter and the receiver are included as part of a transceiver supporting wireless connectivity between the device and the user computing system.

44. The electronic device of claim 43, further comprising a serial peripheral interface (SPI) driver that redirects data between the virtual data object and the transceiver.

45. A user computing system comprising:
   a transmitter;
   a receiver;
   a processing device;
   an application, that when executed by the processing device, instantiates an interface in the user computing system enabling a user interaction with a plurality of virtual data objects in an electronic device represented by a plurality of resources, wherein the plurality of virtual data objects contain data relating to a functionality of the electronic device and wherein the application is created by the processing device based upon, at least in part, an application schema generated from resource defining code received by the processing device, wherein the resource defining code includes one or more resource definitions of the plurality of resources; and
   a user framework to instantiate a connection independent protocol to transfer a parameter and a data object value between the user computing system and the electronic device using the transmitter and the receiver, the user framework including an association between the plurality of virtual data objects and the parameter in the connection independent protocol and defining a first data object value to be written to the electronic device and a second data object value to be read from the electronic device according to the connection independent protocol.

46. The user computing system of claim 45, wherein responsive to a request in the application to write data to a predetermined virtual data object:
   the user framework identifies a unique parameter associated with the predetermined virtual data object, and
   the transmitter transmits the identified unique parameter and the first data object value to be written to the electronic device according to the connection independent protocol.

47. The user computing system of claim 46, wherein responsive to a request in the application to read data from a predetermined virtual data object:
   the user framework identifies a unique parameter associated with the predetermined virtual data object,
   the transmitter transmits the identified unique parameter as part of a read request to the electronic device according to the connection independent protocol,
   the receiver receives from the electronic device the unique parameter and the second data object value read from the predetermined virtual object in device according to the connection independent protocol, and
   the user framework identifies the predetermined virtual data object associated with the received unique parameter, and
   the user computing system associates the received data with the identified predetermined virtual data object.

48. The user computing system of claim 46, wherein the transmitter and the receiver are included as part of a transceiver supporting wireless connectivity between the electronic device and the user computing system.

49. A computer-implemented method comprising:
generating, using a processing device, an application schema for a user computing system and embedded adapter code for an electronic device from resource defining code including a plurality of resource definitions for a plurality of resources defining a data type, a behavior, and a range of valid values of a plurality of a virtual data objects in an electronic device, wherein one or more user applications compliant with the plurality of resources are created via the application schema;
including in the application schema (i) the defined data type, behavior, and range of valid values of each resource, (ii) an implementation of a protocol enabling a transfer of data between the plurality of virtual data objects of the electronic device and an application of a user computing system providing an interface for an interaction with the virtual data object, and (iii) an association of each resource with a respective parameter specified in the protocol; and
including in the embedded adapter code (i) a placeholder to insert additional code mapping each resource to a memory segment in the electronic device containing its respective virtual data object, (ii) the implementation of the protocol, and (iii) the association of each resource with the respective parameter specified in the protocol.

50. A non-transitory computer readable medium comprising instructions stored in the non-transitory computer readable medium that, when executed by a processing device of a user computing system, cause the processing device to:
receive resource defining code including one or more resource definitions for a plurality of resources;
instantiate an interface in the user computing system enabling a user interaction with a plurality of virtual data objects in an electronic device represented by the plurality of resources, wherein the plurality of virtual data objects contain data relating to a functionality of the electronic device and wherein the application is created based upon, at least in part, an application schema generated from the resource defining code including the one or more resource definitions of the plurality of resources; and
instantiate a connection independent protocol to transfer a parameter and a data object value between the user computing system and the electronic device using a transmitter and a receiver of the user computing system, wherein the connection independent protocol specifies an association between the plurality of virtual data objects and the transferred parameter and defines a first data object value to be written to the electronic device and a second data object to be read from the electronic device according to the connection independent protocol.

51. A non-transitory computer readable medium comprising instructions stored in the non-transitory computer readable medium that, when executed by a processing device of an electronic device, cause the processing device to:
receive resource defining code including one or more resource definitions for a plurality of resources;
generate embedded adapter code mapping the plurality of resources to a plurality of memory segments in the electronic device containing a plurality of virtual data objects, wherein generating the embedded adapter code includes processing the resource defining code including the one or more resource definitions of the plurality of resources and creating one or more code placeholders for each resource definition where additional code mapping the resource to the memory segment in the electronic device is configured to be inserted;
map the plurality of virtual data objects in the electronic device to the plurality of resources based upon the embedded adapter code, the plurality of virtual data objects containing data relating to a functionality of the electronic device; and
implement a protocol for transferring a parameter and a value associated with the parameter between the electronic device and a user computer system through a transmitter and a receiver of the electronic device, wherein the protocol includes a mapping of each of the resources to a unique parameter in the protocol.

* * * * *